(12) United States Patent
Sakamoto et al.

(10) Patent No.: US 9,127,441 B2
(45) Date of Patent: Sep. 8, 2015

(54) INDUSTRIAL MACHINE

(71) Applicant: SUMITOMO HEAVY INDUSTRIES, LTD., Tokyo (JP)

(72) Inventors: Shinichi Sakamoto, Yokosuka (JP); Hideaki Yuasa, Yokosuka (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 14/337,651

(22) Filed: Jul. 22, 2014

(65) Prior Publication Data
US 2014/0330489 A1    Nov. 6, 2014

Related U.S. Application Data

(63) Continuation of application No. PCT/JP2013/001956, filed on Mar. 22, 2013.

(30) Foreign Application Priority Data

Mar. 26, 2012   (JP) .................................. 2012-069152
Mar. 30, 2012   (JP) .................................. 2012-079553

(51) Int. Cl.
*E02F 3/43* (2006.01)
*H02M 7/00* (2006.01)
(Continued)

(52) U.S. Cl.
CPC .............. *E02F 3/43* (2013.01); *B66F 9/07572* (2013.01); *E02F 9/123* (2013.01); *E02F 9/2075* (2013.01);
(Continued)

(58) Field of Classification Search
CPC ... H02M 7/003; H02M 3/1582; H02M 5/458; H02M 7/5387; H02M 2001/007; E02F 9/2091; E02F 9/2095; E02F 3/43; E02F 9/123; E02F 9/2075; B66F 9/07572

USPC .......... 701/60, 22; 307/9.1, 10.1; 180/65.275, 180/65.21, 65.27, 65.28; 903/903; 361/728
See application file for complete search history.

(56) References Cited

U.S. PATENT DOCUMENTS

| 8,639,404 B2 | 1/2014 | Sugiyama et al. |
| 2007/0103002 A1* | 5/2007 | Chiao et al. .................. 307/10.1 |

(Continued)

FOREIGN PATENT DOCUMENTS

| JP | 6-058521 U | 8/1994 |
| JP | 2524642 Y2 | 2/1997 |

(Continued)

OTHER PUBLICATIONS

International Search Report dated Jun. 25, 2013 corresponding to International Patent Application No. PCT/JP2013/001956 and English translation thereof.

*Primary Examiner* — Marthe Marc-Coleman
(74) *Attorney, Agent, or Firm* — Squire Patton Boggs (US) LLP

(57) ABSTRACT

An industrial machine includes a power converter. The power converter includes: at least one power module; a capacitor; and a bus bar provided between any two among a load to be driven, the power module, and the capacitor. The bus bar includes: a first plate; a second plate; a first spacer configured to support respective corresponding first ends of the first plate and the second plate with a predetermined distance therebetween and to electrically connect the respective first ends of the first plate and the second plate with each other; and a second spacer configured to support respective corresponding second ends of the first plate and the second plate with a predetermined distance therebetween and to electrically connect the respective second ends of the first plate and the second plate with each other.

8 Claims, 21 Drawing Sheets

(51) Int. Cl.
*E02F 9/20* (2006.01)
*B66F 9/075* (2006.01)
*E02F 9/12* (2006.01)
*H02M 3/158* (2006.01)
*H02M 5/458* (2006.01)
*H02M 7/5387* (2007.01)
*H02M 1/00* (2007.01)

(52) U.S. Cl.
CPC ............ *E02F 9/2091* (2013.01); *E02F 9/2095* (2013.01); *H02M 7/003* (2013.01); *H02M 3/1582* (2013.01); *H02M 5/458* (2013.01); *H02M 7/5387* (2013.01); *H02M 2001/007* (2013.01)

(56) References Cited

U.S. PATENT DOCUMENTS

2009/0092956 A1* 4/2009 Kumagai et al. .............. 434/301
2014/0107881 A1 4/2014 Sugiyama et al.

FOREIGN PATENT DOCUMENTS

| JP | 10-103112 A | 4/1998 |
| JP | 10-145941 A | 5/1998 |
| JP | 2010-222815 A | 10/2010 |
| JP | 2010-226782 A | 10/2010 |
| JP | 2011-129636 A | 6/2011 |

* cited by examiner

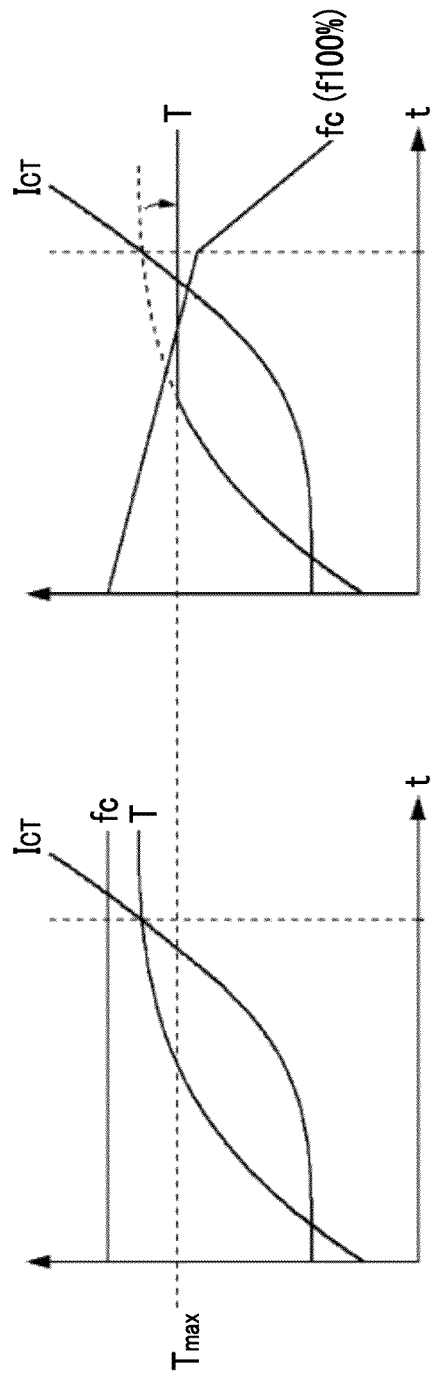

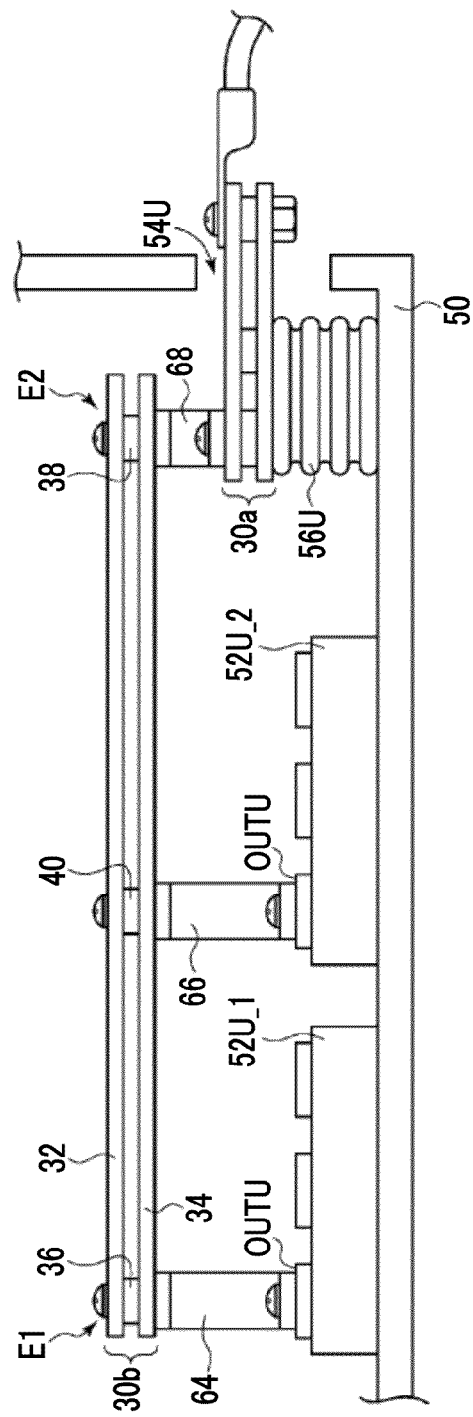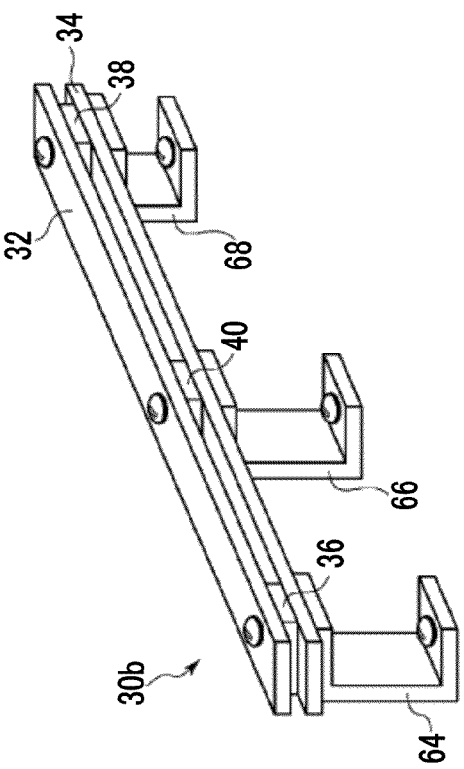

INDUSTRIAL MACHINE

INCORPORATION BY REFERENCE

Priority is claimed to Japanese Patent Application No. 2012-069152, filed Mar. 26, 2012, Japanese Patent Application No. 2012-079533, filed Mar. 30, 2012, and International Patent Application No. PCT/JP2013/001956, the entire content of each of which is incorporated herein by reference.

BACKGROUND

1. Technical Field

The present invention relates to an industrial machine using a power converter.

2. Description of the Related Art

In recent construction machines including a power shovel or a crane, a hybrid type of a hydraulic motor and an AC motor is used as a power source of an upper swivel body. The hybrid type swiveling power source assists a hydraulic motor with the AC motor during acceleration of the upper swivel body, performs a regenerative operation with an AC motor during deceleration, and charges a battery with power generation energy. The pertinent technique is disclosed in the related art. Additionally, for example, a power converter for driving the electric motor is also mounted in industrial machines other than the construction machines, for example, a forklift and a forging press machine.

The power converter (inverter) for driving the AC motor includes a plurality of switching elements that are provided for respective phases of the AC motor, a controller that generates a control signal modulated according to the target torque (or target rotation speed) of the AC motor, and a driver that drives the plurality of switching elements on the basis of the control signal.

SUMMARY

According to an embodiment of the present invention there is provided a power converter includes at least one power module, a capacitor, and a bus bar provided between any two among a load to be driven, the power module, and the capacitor. The bus bar includes a first plate, a second plate, a first spacer configured to support respective corresponding first ends of the first plate and the second plate with a predetermined distance therebetween and to electrically connect the respective first ends of the first plate and the second plate with each other, and a second spacer configured to support respective corresponding second ends of the first plate and the second plate with a predetermined distance therebetween and to electrically connect the respective second ends of the first plate and the second plate with each other.

BRIEF DESCRIPTION OF THE DRAWINGS

FIG. 7A is a waveform chart when the carrier frequency control is not performed, and FIG. 7B is a waveform chart when the carrier frequency control is performed.

FIG. 13A is a cross-sectional view of a power converter related to a first modification example, and FIG. 13B is a perspective view of a bus bar of FIG. 13A.

DETAILED DESCRIPTION

Figure 1:
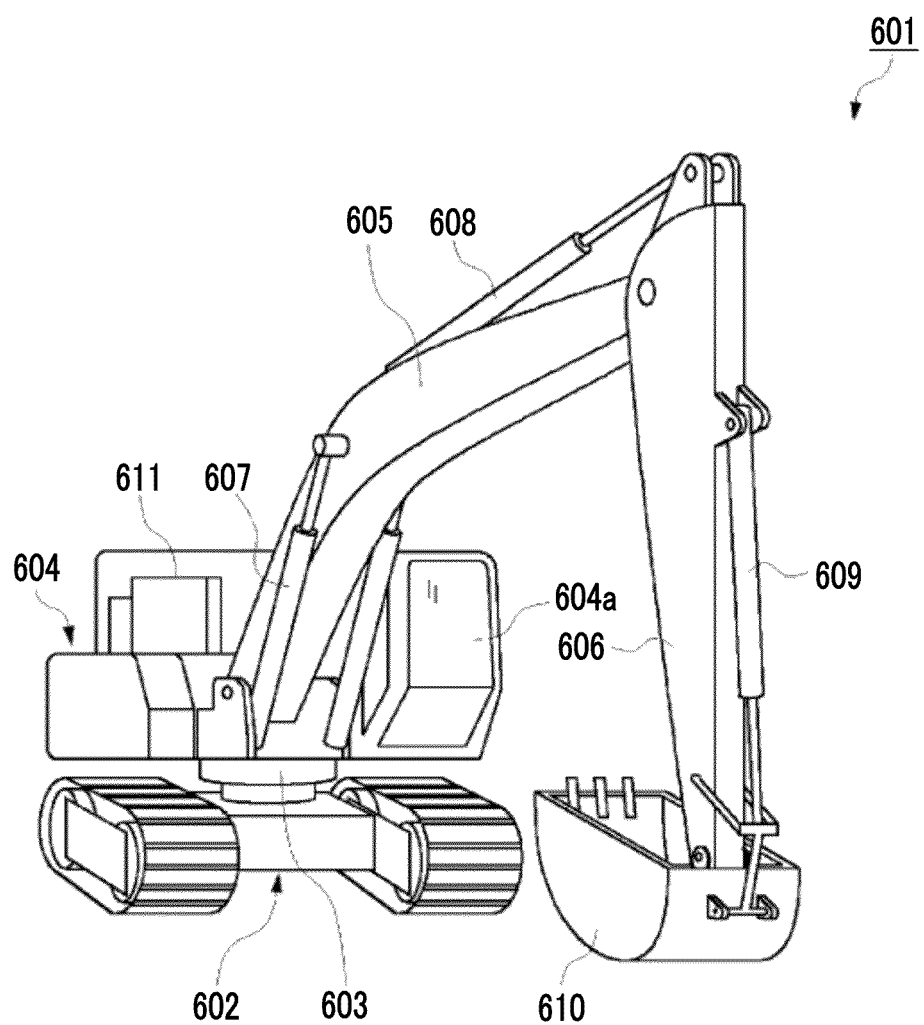
FIG. 1 is a perspective view illustrating an outer shape of a shovel that is an example of a construction machine equipped with an electrical swiveling device related to one embodiment.

Since a high electrical current flows to the power converter used for the industrial machine, a temperature rise is striking. For this reason, if temperature abnormality occurs in the power converter, it is impossible to continue work.

It is desirable to provide a power converter in which temperature measures are taken, and an industrial machine including the power converter.

According to the embodiment of the invention, as the first plate and the second plate are laminated with a distance therebetween, the surface area of a conductor can be increased, the current capacity of the bus bar can be increased even in a situation where the size of the bus bar is limited, and the power converter and the industrial machine can be miniaturized.

In the embodiment, the power converter may further include a reactor. The bus bar may be provided between any two among the load, the power module, the capacitor, and the reactor.

The bus bar may further include at least one third spacer that is provided in at least one place between the first ends and the second ends of the first plate and the second plate and is configured to electrically connect corresponding places of the first plate and the second plate with each other.

By providing the third spacer, concentration of a current on one of the first plate and the second plate can be suppressed, and the current can be equalized.

The embodiment of the invention relates to an electrical swiveling device that is mounted on an industrial machine including a traveling mechanism and an upper swivel body mounted on the traveling mechanism so as to be capable of being swiveled and that swivels the swivel body with the power generated by an AC motor, and an industrial machine including the electrical swiveling device.

The electrical swiveling device controls the AC motor that swivels and drives the upper swivel body with respect to the traveling mechanism. The electrical swiveling device includes a carrier frequency control unit that lowers the carrier frequency of the power converter as a current flowing to the power converter becomes larger, in addition to the power converter that is provided at the upper swivel body to drive the AC motor.

If the current flowing to the power converter becomes large, local heat generation in the power module can become large with the increase in current. According to this aspect, as the carrier frequency of the power converter is lowered according to the current of the power converter, the temperature fluctuation of the power module can be suppressed, a stress strain can be reduced, and reliability can be enhanced.

The carrier frequency control unit may change the carrier frequency during swiveling acceleration of the AC motor. Additionally, the carrier frequency control unit may change the carrier frequency during swiveling deceleration of the AC motor.

The current flowing to the power module becomes large particularly during swiveling acceleration accompanying the start of swiveling or swiveling deceleration accompanying the stop of swiveling, and generates a local stress in the power module. Therefore, the reliability of the power module can be enhanced by reducing the carrier frequency during the swiveling deceleration or during the swiveling acceleration.

The carrier frequency control unit may lower the carrier frequency as the temperature of the power module constituting the power converter becomes higher.

The carrier frequency control unit may keep the carrier frequency constant when a current flowing to the power converter is equal to or lower than a predetermined value, and may lower the carrier frequency linearly according to the current when the current flowing to the power converter becomes higher than the predetermined value.

In addition, arbitrary combinations of the above constituent elements, and those obtained by substituting the constituent elements or expressions of the invention with each other between apparatuses, methods, systems, and the like are also effective as the aspects of the invention.

According to the invention, the capacity of the bus bar used for the power converter can be made high.

Hereinafter, the invention will be described, referring to the drawings on the basis of preferred embodiments. The same or equivalent constituent elements, members, and processings illustrated in the respective drawings will be designated by the same reference numerals, and duplicate description will be appropriately omitted. Additionally, the embodiments do not limit the invention but are merely illustrative, and all characteristics and combinations described in the embodiments are not necessarily essential.

A case where connection is indirectly made via a member is also included.

Similarly "a state where a member C is provided between a member A and a member B" also includes cases where the member A and the member C or the member B and the member C are directly connected or indirectly connected via other members that neither substantially affect electrically connected states of these members and nor impair the functions and effects exhibited by the coupling of the members.

One Embodiment 1.1 Problems Regarding Electrical Swiveling Device

As described above, a hybrid type of a hydraulic motor and an AC motor is used as a power source of an upper swivel body in construction machines including a power shovel or a crane. The swivel body of the construction machine frequently repeats swiveling and stopping. When the swivel body of the construction machine in a stopped state is accelerated or when the swivel body in a rotation state is decelerated, a high current flows to a switching element. Generally, since the switching element is built in a power module including an insulated gate bipolar transistor (IGBT), solder may be used for electric connection inside the power module.

The power module is thermally coupled with a heat sink, and the consideration of suppressing a temperature rise is taken into account. However, even in this case, temperature fluctuates locally whenever a high current flows to the switching element. Since materials, such as solder, wiring lines, and substrates within the power module, have different coefficients of thermal expansion, respectively, a stress strain is caused with the temperature fluctuation of the switching element. The stress strain becomes a cause of solder cracking or the like, and affects the reliability of the power module.

Hereinafter, an electrical swiveling device according to an embodiment of the invention will be described.

1.2 Electrical Swiveling Device Related to One Embodiment

FIG. 1 is a perspective view illustrating an outer shape of a shovel 601 that is an example of a construction machine equipped with an electrical swiveling device 500 related to the one embodiment. The shovel 601 mainly includes a traveling mechanism 602, and a swivel body 604 that is turnably mounted on an upper part of the traveling mechanism 602 via a swiveling mechanism 603.

A boom 605, an arm 606 linked to a tip of the boom 605, and a bucket 610 linked to a tip of the arm 606 is attached to the swivel body 604. The bucket 610 is a facility for capturing suspended loads, such as earth and sand and a steel material. The boom 605, the arm 606, and the bucket 610 are hydraulically driven by a boom cylinder 607, an arm cylinder 608, and a bucket cylinder 609, respectively. Additionally, the swivel body 604 is provided with a cabin 604a for accommodating a manipulator who manipulates the position of the bucket 610 and performs a magnetizing operation and a releasing operation thereof, and a power source, such as an engine 611 for generating hydraulic pressure. The engine 611 is constituted by, for example, a diesel engine.

Figure 2:
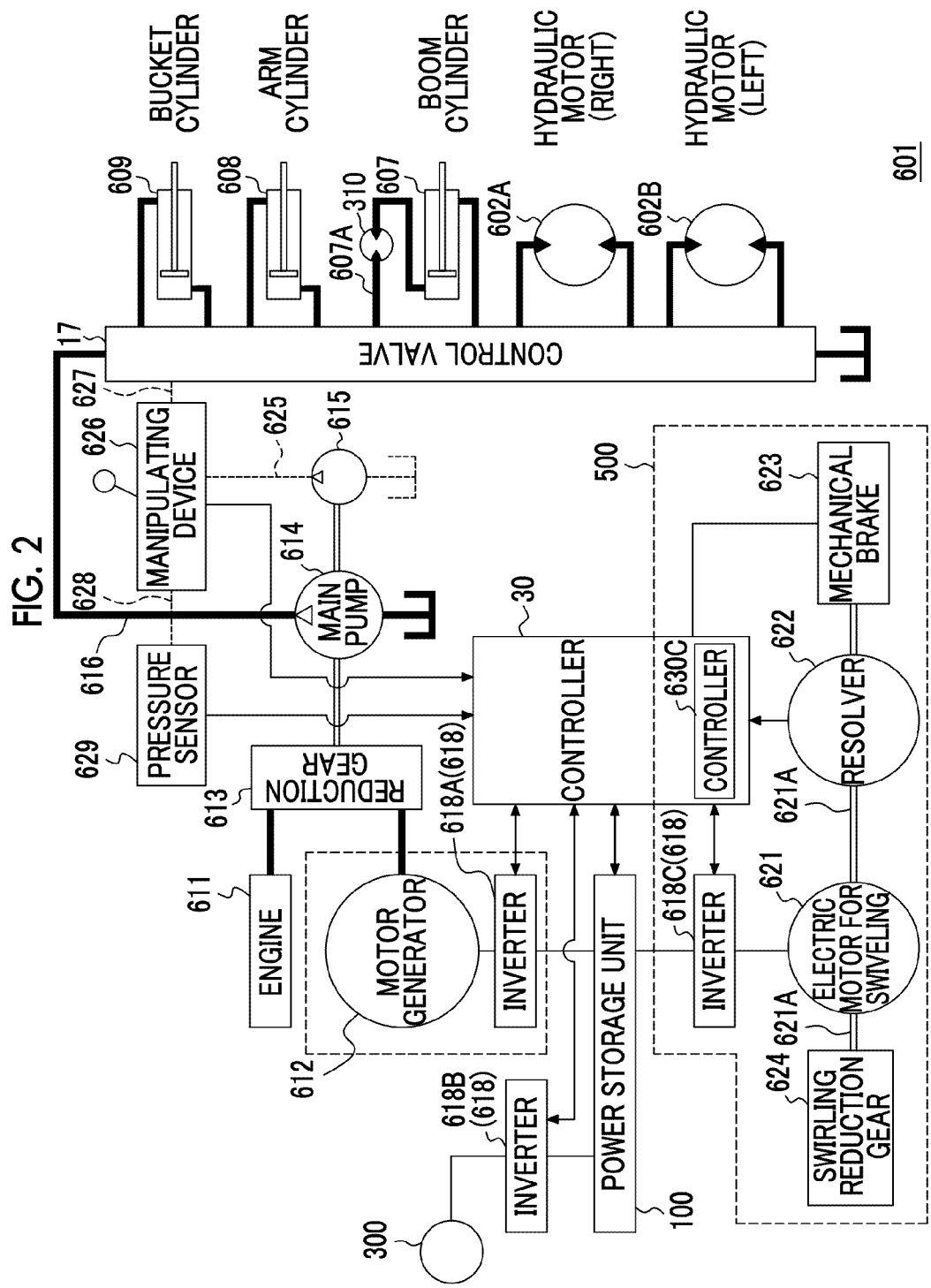
FIG. 2 is a block diagram illustrating an electric system, a hydraulic system, and the like of the shovel related to one embodiment.

FIG. 2 is block diagrams illustrating an electric system, a hydraulic system, and the like of the shovel 601 related to the one embodiment. In addition, in FIG. 2, a system that mechanically transmits power is shown by double lines, the hydraulic system is shown by thick solid lines, a control system is shown by dashed lines, and the electric system is shown by thin solid lines.

The shovel 601 includes a motor generator 612 and a reduction gear 613, and both rotary shafts of the engine 611 and the motor generator 612 are coupled to each other by being connected to an input shaft of the reduction gear 613.

When the load of the engine 611 is large, the motor generator 612 assists the driving force of the engine 611 with its own driving force, and the driving force of the motor generator 612 is transmitted to a main pump 614 through an output shaft of the reduction gear 613. On the other hand, when the load of the engine 611 is small, the driving force of the engine 611 is transmitted to the motor generator 612 through the reduction gear 613, whereby the motor generator 612 generates electricity. The motor generator 612 is constituted by, for example, an interior permanent magnetic (IPM) motor in which magnets are embedded inside a rotor. The switching between the driving and power generation of the motor generator 612 is performed by a controller 630 that controls the driving of the electric system in the shovel 601 according to the load or the like of the engine 611.

The main pump 614 and a pilot pump 615 are connected to the output shaft of the reduction gear 613, and a control valve 617 is connected to the main pump 614 via a high-pressure hydraulic line 616. The control valve 617 is a device that controls a hydraulic system in the shovel 601. The boom cylinder 607, the arm cylinder 608, and the bucket cylinder 609 in addition to hydraulic motors 602A and 602B for driving the traveling mechanism 602 illustrated in FIG. 1 are connected to the control valve 617 via a high-pressure hydraulic line, and the control valve 617 controls hydraulic pressures supplied to these cylinders according to a driver's manipulation input.

A secondary-side (output) end of an inverter 618A is connected to the electrical terminal of the motor generator 612. A power storage unit 100 is connected to a primary-side (input) end of the inverter 618A. The power storage unit 100 includes a battery that is a storage battery, for example, a step-up/down converter that controls the charge and discharge of the battery, and DC buses made of positive and negative DC wiring lines (not illustrated). Here, the DC buses constitute a constant voltage power storage unit, and the battery constitutes a fluctuating voltage power storage unit. That is, an input terminal of the inverter 618A is connected to an input terminal of the step-up/down converter via the DC buses. A battery serving as a power storage is connected to an output end of the step-up/down converter. Additionally, although a capacitor is illustrated as an example of the above-described power storage, instead of the capacitor, a secondary battery, such as a lithium ion battery, or other types of power sources capable of transmitting and receiving electric power may be used as the power storage.

The inverter 618A performs an operation control of the motor generator 612 on the basis of a command from the controller 630. That is, when the inverter 618A performs a powering operation of the motor generator 612, required electric power is supplied from the battery and the step-up/down converter via the DC buses to the motor generator. Additionally, when a regenerative operation of the motor generator 612 is performed, the electric power generated by the motor generator 612 is charged to the battery via the DC buses and the step-up/down converter. In addition, the switching control between a step-up operation and a step-down operation of the step-up/down converter is performed by the controller 630 on the basis of a DC bus voltage value, a battery voltage value, and a battery current value. This enables the DC buses to be maintained in a state where electricity is stored with a predetermined constant voltage value.

A boom-regenerating generator 300 is connected to the power storage unit 100 via the inverter 618B. A hydraulic motor 310 is connected to the boom cylinder 607, and a rotary shaft of the boom-regenerating generator 300 is driven by the hydraulic motor 310. The boom-regenerating generator 300 is an electrical working element that converts potential energy into electrical energy when the boom 605 is lowered by the action of gravity.

The hydraulic motor 310 is configured so as to be rotated by the oil discharged from the boom cylinder 607 when the boom 605 is lowered, and it is provided in order to convert the energy when the boom 605 is lowered according to the gravity into rotative force. The hydraulic motor 310 is provided in a hydraulic oil pipe 607A between the control valve 617 and the boom cylinder 607. The electric power generated in the boom-regenerating generator 300 is supplied to the power storage unit 100 through the inverter 618B as regenerative energy.

The electrical swiveling device 500 is provided at the swiveling mechanism 603 of FIG. 1 to turn the upper swivel body 604. The electrical swiveling device 500 mainly includes an inverter 618C for swiveling, an electric motor 621 for swiveling, a resolver 622, a mechanical brake 623, a swiveling reduction gear 624, and a portion 630C of the controller 630.

The electric motor 621 for swiveling is an AC motor, and is a power source of the swiveling mechanism 603 that swivels the swivel body 604. The resolver 622, the mechanical brake 623, and the swiveling reduction gear 624 are connected to a rotary shaft 621A of the electric motor 621 for swiveling. The inverter 618C for swiveling receives the electric power from the power storage unit 100, and drives the electric motor 621 for swiveling. Moreover, during the regenerative operation of the electric motor 621 for swiveling, the electric power from the electric motor 621 for swiveling is recovered in the power storage unit 100.

When the electric motor 621 for swiveling performs the powering operation, the rotative force of the rotational driving force of the electric motor 621 for swiveling is amplified in the swiveling reduction gear 624, and the swivel body 604 is controlled for acceleration and deceleration to perform a rotational motion. Additionally, a rotation speed is increased in the swiveling reduction gear 624 by the inertia rotation of the swivel body 604, and is transmitted to the electric motor 621 for swiveling so as to generate regenerative electric power. The electric motor 621 for swiveling is AC-driven by the inverter 618C for swiveling, using a pulse width modulation (PWM) control signal. As the electric motor 621 for swiveling, for example, a magnets-embedded IPM motor is suitable.

The resolver 622 is a sensor that detects the rotational position and rotational angle of the rotary shaft 621A of the electric motor 621 for swiveling, and is mechanically coupled with the electric motor 621 for swiveling to thereby detect the rotational angle and rotational direction of the rotary shaft 621A. As the resolver 622 detects the rotational angle of the rotary shaft 621A, the rotational angle and rotational direction of the swiveling mechanism 603 are derived. The mechanical brake 623 is a braking system that generates a mechanical braking force, and mechanically stops the rotary shaft 621A of the electric motor 621 for swiveling, using a command from the controller 630. The swiveling reduction gear 624 is a reduction gear that reduces the rotating speed of the rotary shaft 621A of the electric motor 621 for swiveling and mechanically transmits the reduced rotating speed to the swiveling mechanism 603.

The above configuration is the configuration of the electrical swiveling device 500.

A manipulating device 626 is connected to the pilot pump 615 via a pilot line 625. The manipulating device 626 is a manipulating device for manipulating the electric motor 621 for swiveling, the traveling mechanism 602, the boom 605, the arm 606, and the bucket 610, and is manipulated by a manipulator. A control valve 617 is connected to the manipulating device 626 via a hydraulic line 627, and a pressure sensor 629 is connected to the manipulating device via a hydraulic line 628. The manipulating device 626 converts a hydraulic pressure (primary-side hydraulic pressure) supplied through the pilot line 625 into a hydraulic pressure (secondary-side hydraulic pressure) according to a manipulator's manipulation quantity, and outputs the converted hydraulic pressure. The secondary-side hydraulic pressure output from the manipulating device 626 is supplied to the control valve 617 through the hydraulic line 627 and is detected by the pressure sensor 629.

If the manipulation for swiveling the swiveling mechanism 603 is input to the manipulating device 626, the pressure sensor 629 detects this manipulation quantity as a change in hydraulic pressure within the hydraulic line 628. The pressure sensor 629 outputs an electrical signal indicating the hydraulic pressure within the hydraulic line 628. This electrical signal is input to the controller 630, and is used for controlling the driving of the electric motor 621 for swiveling.

The controller 630 is constituted by an arithmetic processing device including a central processing unit (CPU) and an internal memory, and is realized as the CPU executes a program for driving control stored in the internal memory. The controller 630 receives manipulation input from various sensors, the manipulating device 626, and the like to controls the driving of the inverters 618A, 618B, and 618C, the power storage unit 100, and the like.

The above configuration is the overall configuration of the shovel 601. Subsequently, the electrical swiveling device 500 related to the one embodiment will be described in detail. In order to make the electric motor 621 for swiveling generate a high torque when the swivel body 604 is started (accelerated), it is necessary to supply a high current from the inverter 618C for swiveling to the electric motor 621 for swiveling. Additionally, during a regenerative motion when the swivel body 604 is stopped (decelerated), a high current from the electric motor 621 for swiveling is supplied to the power storage unit 100 via the inverter 618C for swiveling. Additionally, even during constant-speed swiveling, a high current flows to the inverter 618C for swiveling when a heavy load is carried in the bucket 610 or the arm 606 comes into contact with an obstacle.

In the electrical swiveling device 500 that frequently repeats swiveling and stopping, if a high current frequently flows to the inverter 618C for swiveling, a stress strain is caused inside the power module that constitutes the inverter 618C for swiveling, or around the power module, and there is a concern that the reliability of the electrical swiveling device 500 may degrade. A technique for solving such a problem will be described below.

Figure 3:
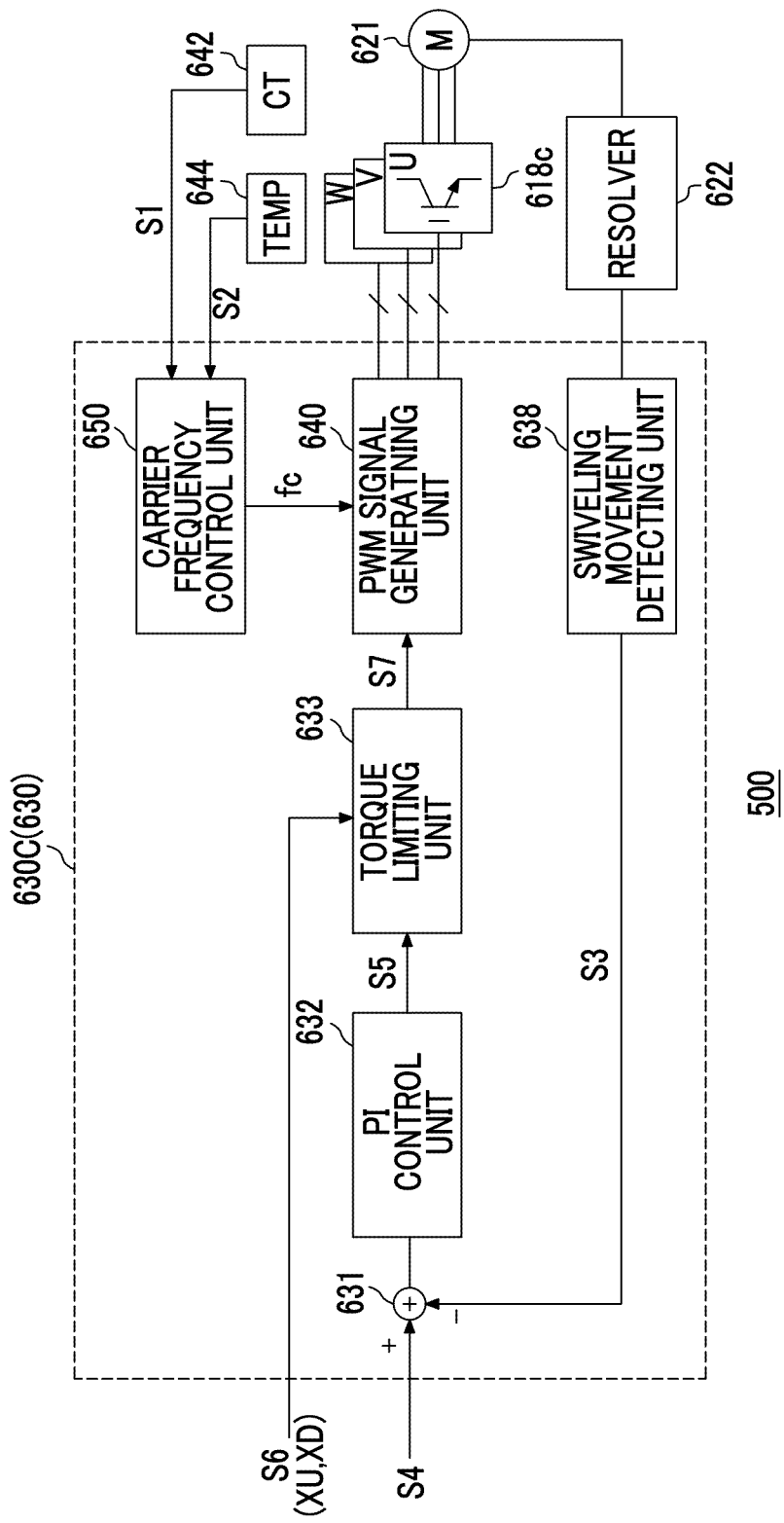
FIG. 3 is a block diagram illustrating the configuration of an electrical swiveling device.

FIG. 3 is a block diagram illustrating the configuration of the electrical swiveling device 500. The electrical swiveling device 500 includes the inverter 618C for swiveling, the electric motor 621 for swiveling, the resolver 622, a current sensor 642, a temperature sensor 644, and an inverter control unit 630C that is a portion of the controller 630.

For example, the electric motor 621 for swiveling is a three-phase AC motor, and the inverter 618C for swiveling includes U-phase, V-phase, and W-phase switching circuits. The current sensor 642 detects currents that flow to the respective phases of the inverter 618C, and outputs a current detection value S1 indicating a current value to the inverter control unit 630C. For example, the current sensor 642 may detect at least one or several combinations of output currents of the respective phases of the inverter 618C for swiveling, currents that flow to upper arms of the respective phases, and currents that flow to lower arms of the respective phases.

The switching circuits that constitute the inverter 618C for swiveling are constituted by, for example, power transistors, such as insulated gate bipolar transistors (IGBTs), and the power transistors are built in an intelligent power module (IPM). The IPM is mounted with various sensors, such as temperature sensors, the various sensors detect phenomena, such as an overcurrent, a control power source voltage drop, output short-circuiting, and temperature abnormality, and when these phenomena are detected, an IPM error signal is output. Here, the phenomenon of the temperature abnormality means that the temperature of the inverter becomes equal to or higher than a predetermined operation stop temperature. The operation stop temperature is set to, for example, 100° C. The IPM stops supply of a current for driving a motor to be driven in order to prevent burnout of the motor to be driven and the inverter if the IPM error signal is detected. In this case, the operation of the shovel 601 itself is stopped, and continuous operation is interrupted. Although this automatic stop protection is required from a viewpoint of an improvement in reliability, the automatic stop lowers operating efficiency. Therefore, it is desirable that the automatic stop occurs as few times as possible.

The temperature sensor 644 is thermally coupled with the power module, generates a temperature detection value S2 according to the temperature of the power module, and outputs the temperature detection value to the inverter control unit 630C. A thermistor built in the power module or the like may be used as the temperature sensor 644, or the temperature sensor may be provided closest to the power module. When the temperature sensor 644 is built in the power module, a local temperature inside the power module can be detected, and when the temperature sensor is provided outside the power module, an average temperature of the whole power module can be detected. Naturally, temperature sensors 644 may be provided both inside and outside the power module and may generate temperature detection values S2 indicating respective temperatures.

The inverter control unit 630C includes a subtractor 631, a PI control unit 632, a swiveling movement detecting unit 638, a PWM signal generating unit 640, and a carrier frequency control unit 650.

The resolver 622 detects a change in the rotational position of the electric motor 621 for swiveling. The swiveling movement detecting unit 638 calculates a swiveling speed value S3 on the basis of the change in the rotational position of the electric motor 621 for swiveling, and outputs the swiveling speed value to the subtractor 631.

The subtractor 631 subtracts the swiveling speed value S3 from a speed command value S4 indicating the swiveling speed of the electric motor 621 for swiveling, and outputs the deviation between these values. The speed command value S4 is, for example, a command value according to the manipulation quantity of the manipulating device 626 (refer to FIG. 2).

The PI control unit 632 performs a PI control on the basis of the deviation output from the subtractor 631 so that the rotating speed of the electric motor 621 for swiveling approaches the speed command value and the deviation becomes small, and generates a torque current command value S5 for the control.

A torque limiting unit 633 limits the torque current command value S5 to a range equal to or lower than a predetermined torque limit value (an upper limit of the torque) S6 so that a torque generated in the electric motor 621 for swiveling, using the torque current command value S5 output from the PI control unit 632, becomes equal to or lower than a permissible torque value of the electric motor 621 for swiveling. In the inverter control unit 630C that controls the inverter 618C for swiveling, normally, for example, a torque limit value XU during acceleration is set to 150% of a rated torque in the electric motor 621 for swiveling to be driven, and a torque limit value XD during deceleration is set to 250% of the rated torque.

The PWM signal generating unit 640 performs the pulse width modulation of a torque-limited torque current command value S7 with a set carrier frequency fc, thereby generating gate driving pulses with respect to the switching elements (IGBT) for respective phases of the inverter 618C. In the present embodiment, the carrier frequency fc in the PWM signal generating unit 640 is made variable according to the state of the electrical swiveling device 500.

The carrier frequency control unit 650 controls the carrier frequency fc on the basis of on the current detection value S1 from the current sensor 642 and the temperature detection value S2 from the temperature sensor 644.

Figure 4:
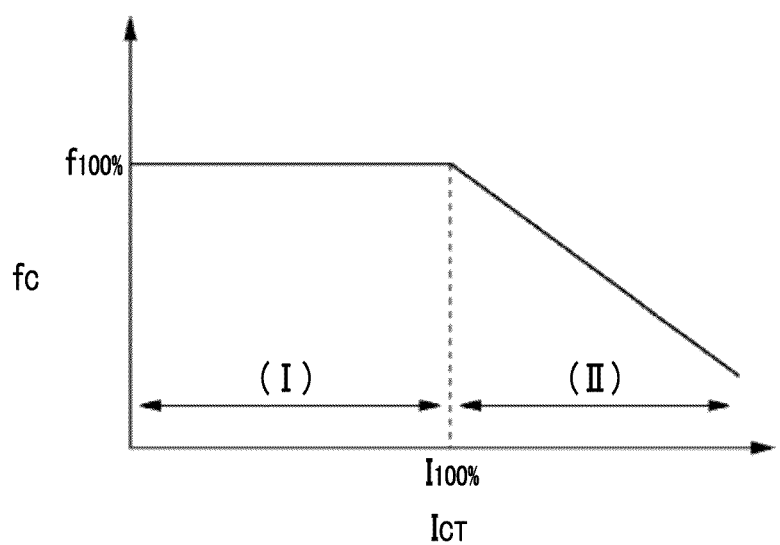
FIG. 4 is a view illustrating an example of a carrier frequency control according to a current.

Specifically, the carrier frequency control unit 650 lowers the carrier frequency fc as a current $I_{CT}$ that flows to the inverter 618C becomes larger. FIG. 4 is a view illustrating an example of a carrier frequency control according to the current $I_{CT}$. The carrier frequency fc is set to a predetermined rated frequency $f_{100\%}$, in a region (I) where the current $I_{CT}$ is equal to or lower than a threshold. The threshold may be, for example, a current value $I_{100\%}$ corresponding to the rated torque.

In a region (II) where the current $I_{CT}$ exceeds the threshold $I_{100\%}$, the carrier frequency fc falls linearly according to the current $I_{CT}$, and is given by Formula (1).

$$fc = a \times (I_{CT} - I_{100\%}) + f_{100\%} \quad (1)$$

a is the inclination of the carrier frequency fc, and has a negative value.

Refer back to FIG. 3. The carrier frequency control unit 650 reflects the temperature of the inverter 618C for swiveling on the carrier frequency fc. Specifically, the carrier frequency control unit 650 refers to the temperature detection value S2, and lowers the carrier frequency fc as the temperature T of the power module constituting the inverter 618C for swiveling becomes higher.

A designer of the inverter 618C for swiveling can predict a temperature rise when a current with a magnitude of a certain carrier frequency flows to the power module in advance. Thus, the carrier frequency control unit 650 lowers the carrier frequency fc as a current temperature T approaches an operation stop temperature Tmax so that the current temperature T does not exceed the operation stop temperature Tmax.

Figure 5:
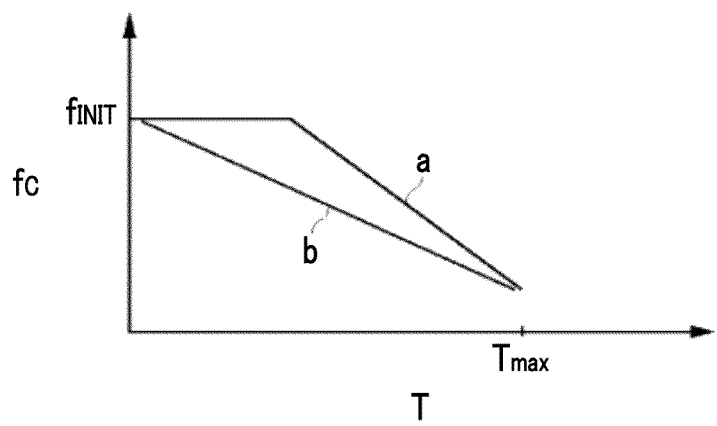
FIG. 5 is a view illustrating several examples of the carrier frequency control according to temperature T.

FIG. 5 is a view illustrating several examples of the carrier frequency control according to temperature T. As shown by a solid line a, the carrier frequency fc may be a predetermined initial frequency $f_{INIT}$ in a region (I) where the temperature T is equal to or lower than a certain threshold, and may fall linearly with respect to the temperature in a region (II) where the temperature is equal to higher than the threshold. Otherwise, as shown by a solid line b, the carrier frequency fc may fall with respect to the temperature in a whole temperature range.

A surrounding human being perceives acoustic noises if the carrier frequency fc of a signal that drives the inverter 618C for swiveling and the electric motor 621 for swiveling is within an audible band (<5 kHz). Since quietness is also required in the shovel 601 that is used even in a city area, it is preferable that the initial frequency $f_{INIT}$ be set to a frequency band that a human being man cannot approach easily, for example, 8 kHz or higher.

The above configuration is the configuration of the electrical swiveling device 500. Subsequently, the operation of the electrical swiveling device will be described.

Figure 6A:
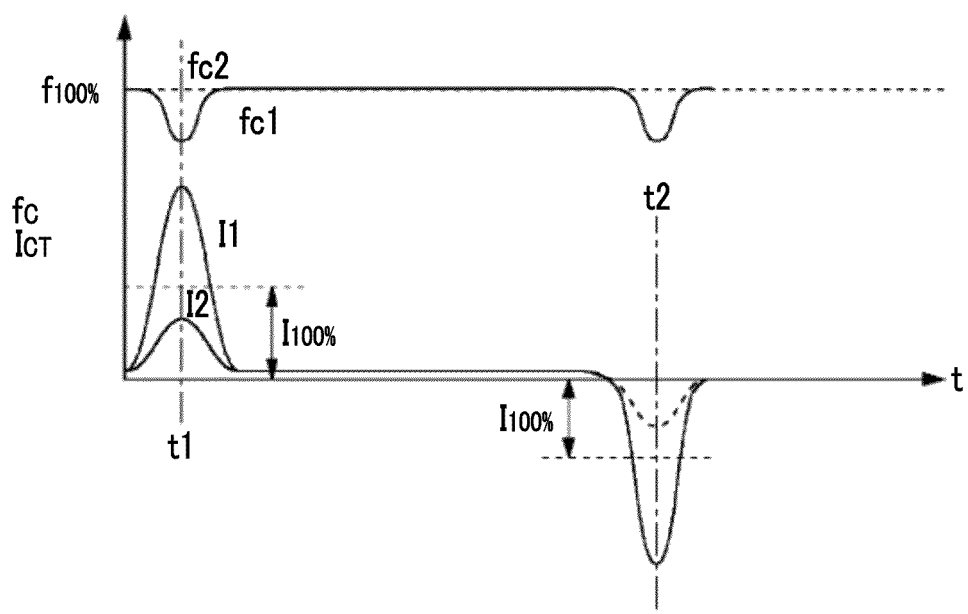
FIG. 6A is a time waveform chart of a carrier frequency and an inverter current.
Figure 6B:
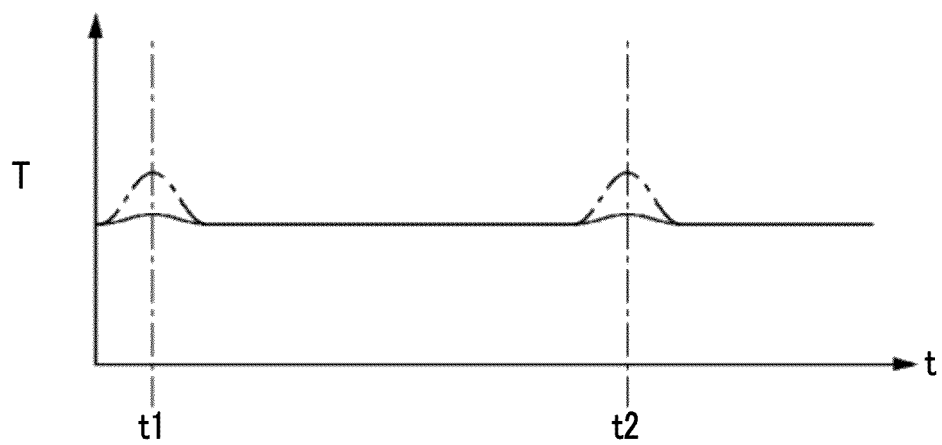
FIG. 6B is a time waveform chart of temperature.

FIG. 6A is a time waveform chart of the carrier frequency fc and the current $I_{CT}$ of the inverter 618C, and FIG. 6B is a time waveform chart of the temperature T.

The acceleration or deceleration of the electric motor 621 for swiveling is performed in short time scales of 2 to 3 seconds, and accordingly, the carrier frequency control based on the current $I_{CT}$ is also performed in short time scales of several seconds. The electric motor 621 for swiveling is accelerated near a time t1, and the electric motor 621 for swiveling is decelerated near a time t2. In addition, a vertical axis and a horizontal axis of a waveform chart or a timing chart in the present specification are appropriately increased or reduced in order to make the invention easily understood, and respective waveforms illustrated are also simplified for easy understanding.

As illustrated in FIG. 6A, when a current I2 equal to or lower than a rated current $I_{100\%}$ flows, a frequency fc2 is maintained at a rated frequency $f_{100\%}$. In this case, since the current I2 is small, as shown by a solid line in FIG. 6B, the temperature of the inverter 618C for swiveling does not rise very much.

On the other hand, when the current I1 equal to or higher than the rated current $I_{100\%}$ flows, a carrier frequency fc1 falls with a rise in the current I1. If the carrier frequency fc is not lowered when the current I1 exceeding the rated current flows, the temperature T rises as shown by one-dot chain line in FIG. 6B. Thus, as the carrier frequency fc is lowered, heat generation of the inverter 618C for swiveling can be suppressed and a temperature rise can be suppressed as shown by a solid line in FIG. 6B.

As illustrated in FIG. 6B, the temperature T instantaneously fluctuates in as the same short time scales as the fluctuation of current $I_{CT}$, but the average value of the temperature T fluctuates in long time scales of several minutes to several hours. Accordingly, it is desirable that a frequency control according to the temperature T be performed in long time scales as will be described below.

Specifically, the rated frequency $f_{100\%}$ may be changed in long time scales on the basis of the temperature T, and the carrier frequency fc may be controlled according to Formula (1) on the basis of the current $I_{CT}$ in short time scales, with the rated frequency $f_{100\%}$ as a basis.

FIG. 7A is a waveform chart when the carrier frequency control is not performed, and FIG. 7B is a waveform chart when the carrier frequency control is performed. The time scales of FIGS. 7A and 7B are sufficiently longer than those of FIGS. 6A and 7B. Moreover, if the current $I_{CT}$ is seen in short time scales, a rise and a falling are repeated as illustrated in FIG. 6A, but currents that are smoothed in time are illustrated in FIGS. 7A and 7B.

First, FIG. 7A is referred to. If the current $I_{CT}$ increases with time when the carrier frequency control is not performed, the temperature T rises with time. If the temperature T exceeds the operation stop temperature Tmax at a time t3, the shovel 601 stops automatically.

Subsequently, the operation when the carrier frequency control is performed will be described with reference to FIG. 7B. In the short time scales that are not illustrated in FIG. 7B, the carrier frequency control is performed according to current $I_{CT}$, and thereby, temperature fluctuation in the short time scales is suppressed. However, even if the carrier frequency control according to the current $I_{CT}$ is performed, the temperature T rises if the average value of the current $I_{CT}$ increases. If the temperature T rises, the rated value $f_{100\%}$ of the carrier frequency fc falls with the temperature rise. This maintains the temperature T at a temperature equal to or lower than the operation stop temperature Tmax.

The above operation is the operation of the electrical swiveling device 500. According to the electrical swiveling device 500, the following effects can be obtained.

As illustrated in FIG. 5, the temperature fluctuation in short time scales is suppressed by performing the carrier frequency control based on the current $I_{CT}$. As a result, the stress strain inside the power module or around the power module can be reduced, the solder cracking or the like can be suppressed, and the reliability of the electrical swiveling device 500 can be enhanced.

Moreover, the carrier frequency control based on the temperature T can be performed to prevent the temperature T from continuing rising in excess of the operation stop temperature Tmax. This can reduce the occurrence frequency of automatic stop of the shovel 601, and can enhance the operating efficiency.

The invention has been described above on the basis of the embodiment. It will be understood by those skilled in the art that the invention is not limited to the above embodiment, various design changes can be made, and such modification examples are also within the scope of the invention. Such modification examples will be described below.

Although a case where both the current and the temperature are reflected on the carrier frequency control has been described in the embodiment, the invention is not limited to this, and the carrier frequency control may be performed on the basis of either the current or the temperature.

Additionally, the relationship between the current and the carrier frequency, and the relationship the temperature and the carrier frequency are not limited to FIGS. 4 and 5. Moreover, the carrier frequency may be defined by a function having both the current and the temperature as arguments, or the relationship between the combination of the current and the temperature, and the carrier frequency may be stored in a table.

In the embodiment, the shovel 601 has been illustrated as an example of the hybrid type construction machine related to the invention. However, other examples of the hybrid type construction machine of the invention may include a lifting magnet vehicle, a crane, and the like equipped with the swiveling mechanism.

Another Embodiment

The technique of suppressing the temperature rise of the power converter through the solution in terms of control has been described in the one embodiment. In contrast, a technique of suppressing the temperature rise of the power converter through a structural solution has been described in another embodiment. The technique related to the other embodiment can be used independently or by combination with the technique related to the one embodiment.

Figure 8:
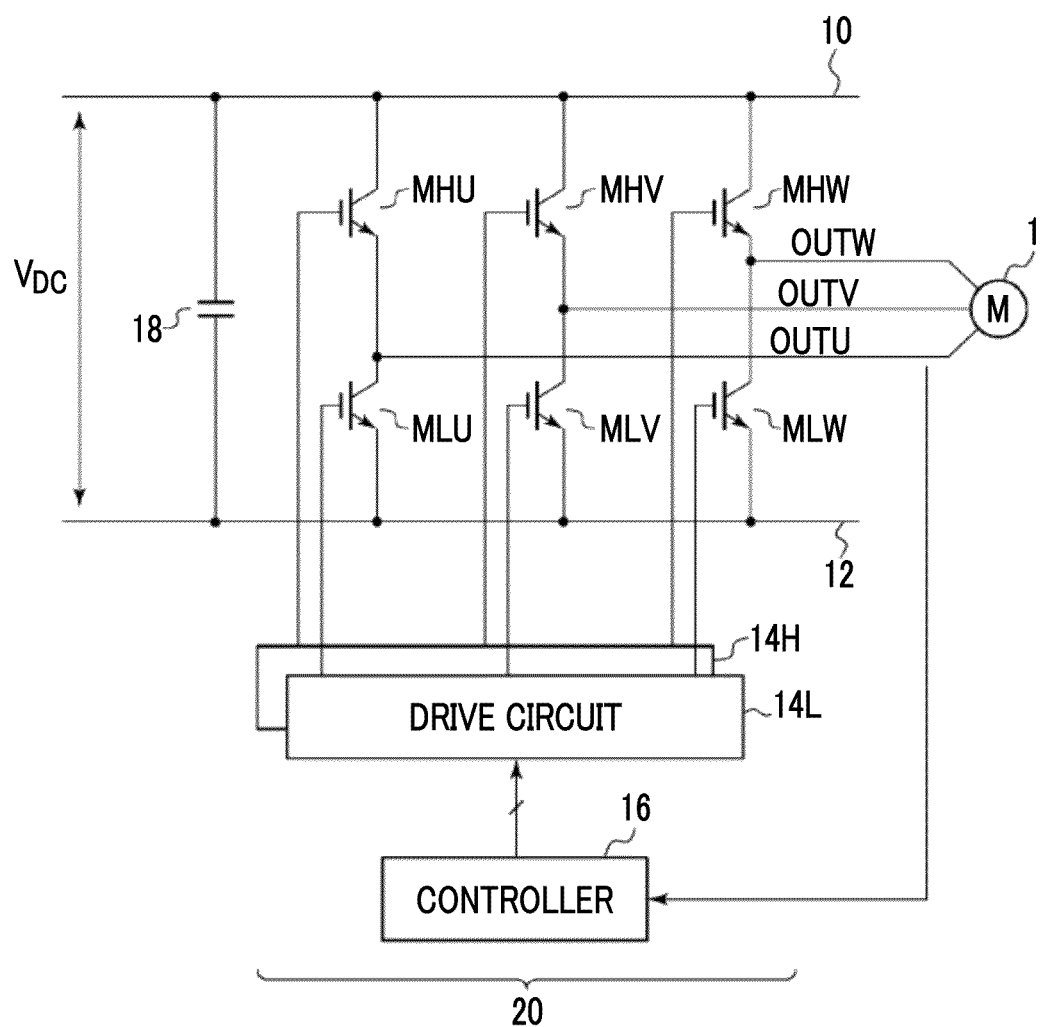
FIG. 8 is a circuit diagram of a general three-phase power converter (inverter).

FIG. 8 is a circuit diagram of the general three-phase power converter (inverter) 2. The power converter 2 receives a direct current voltage $V_{DC}$ generated by a battery or converter (not illustrated), converts the direct current voltage into an alternating current, and supplies the alternating current to a load 1, such as a motor.

The power converter 2 includes an upper power supply line 10, a lower power supply line 12, a smoothing capacitor 18, and an inverter 20.

The smoothing capacitor 18 is provided between the upper power supply line 10 and the lower power supply line 12, and smoothes the direct current voltage $V_{DC}$ between the upper power supply line 10 and the lower power supply line 12.

The inverter 20 includes high-side switches MH (U to W) for respective phases, low-side switches ML (U to W) for respective phases, a high-side drive circuit 14H, a low-side drive circuit 14L, and a controller 16.

Specifically, in each phase, the high-side switch MH and the low-side switch ML are provided in series in order between the upper power supply line 10 and the lower power supply line 12. The controller 16 generates a control signal S1 on the basis of output voltages for respective phases, output currents for respective phases, or the like. The high-side drive circuit 14H switches the high-side switches MH (U to W) for respective phases on the basis of the control signal S1 from the controller 16. Similarly, the low-side drive circuit 14L switches the low-side switches ML (U to W) on the basis of the control signal S1.

In the high-capacity power converter 2, a high current flows to output lines OUTU to OUTW, or wiring lines between the upper power supply line 10 and the high-side switches MH, and wiring lines between the low-side switches ML and the lower power supply line 12. Therefore, the impedances of the wiring lines are required to be low.

Meanwhile, miniaturization of the power converter 2 proceeds, and a space for the wiring lines is narrowed along with this. In such a situation, when it is difficult to lead around thick twist lines or the like having a large diameter, a technique of transmitting a signal through a bus bar is taken. In the related art, the bus bar is generally constituted by one metal plate.

2.1 Problems Regarding Power Converter

The present inventor has come to recognize the following problems, as a result of studying a bus bar to which an alternating current flows.

In the power converter 2 in which frequency becomes higher in recent years, the frequency of the alternating current that flows to the bus bar is also steadily rising. When a high-frequency signal is transmitted through a conductor, it is known that an alternating current flows on the surface of the conductor in a concentrated manner. This is referred to as a skin effect. In order to increase the current capacity of the bus bar, it is necessary to increases the cross-sectional area of a metal conductor to reduce impedance. However, there is a problem that the current capacity does not become large as expected due to the skin effect even if the cross-sectional area is increased by increasing the thickness of the bus bar.

In addition, the above consideration regarding restrictions on the current capacity of the bus bar caused by the skin effect is not regarded as the common general technical knowledge of those skilled in the art.

A power converter for solving this problem will be described below.

2.2 Power Converter Related to Another Embodiment

Figure 9:
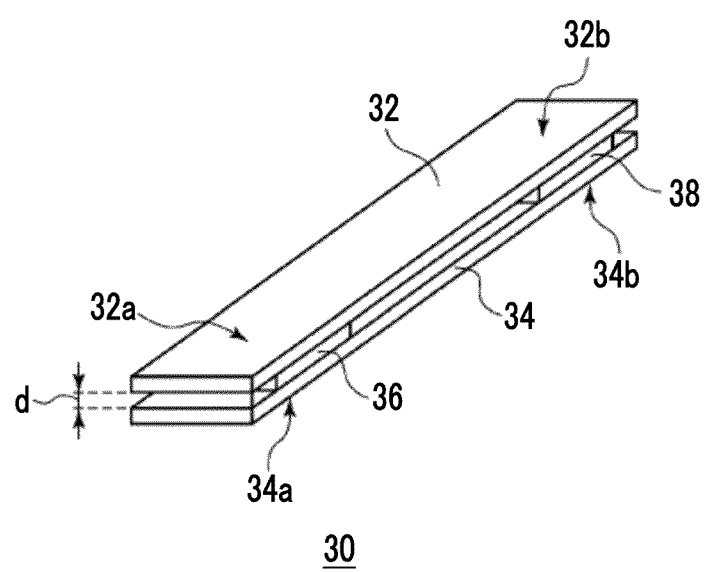
FIG. 9 is a perspective view illustrating a bus bar related to another embodiment.

FIG. 9 is a perspective view illustrating a bus bar 30 related to the other embodiment. The bus bar 30 is mounted on the power converter 2 of FIG. 8. In the power converter 2 of FIG. 8, the high-side switches MH and the low-side switches ML are constituted using at least one power module.

For example, the bus bar 30 is used for a path to which an alternating current flows, including the wiring line between the load 1 and a power module (MH, ML). Otherwise, the bus bar 30 can also be used between the smoothing capacitor 18 of FIG. 8 and the power module (MH, ML).

The bus bar 30 of FIG. 9 mainly includes a first plate 32, a second plate 34, a first spacer 36, and a second spacer 38.

The first plate 32, the second plate 34, the first spacer 36, and the second spacer 38 are made of conductive materials, for example, copper. It is preferable that the thickness of the first plate 32 and the second plate 34 be about 2 mm. The first plate 32 and the second plate 34 have the same shape, are arranged in an overlapping manner. The first spacer 36 has a thickness d and is sandwiched by first ends 32a and 34a of the first plate 32 and the second plate 34, and supports the respective first ends 32a and 34a of the first plate 32 and the second plate 34 with a predetermined distance d therebetween. The first spacer 36 electrically connects the first end 32a of the first plate 32 and the first end 34a of the second plate 34 to each other. The second spacer 38 supports respective second ends 32b and 34b of the first plate 32 and the second plate 34 with a predetermined distance d therebetween. The second spacer 38 electrically connects the second end 32b of the first plate 32 and the second end 34b of the second plate 34 to each other.

The first plate 32, the second plate 34, the first spacer 36, and the second spacer 38 may be fixed with screws as will be described below, and may be connected to each other by a separate structure.

The above configuration is the configuration of the bus bar 30. Subsequently, the specific applications of the bus bar will be described.

Figure 10A:
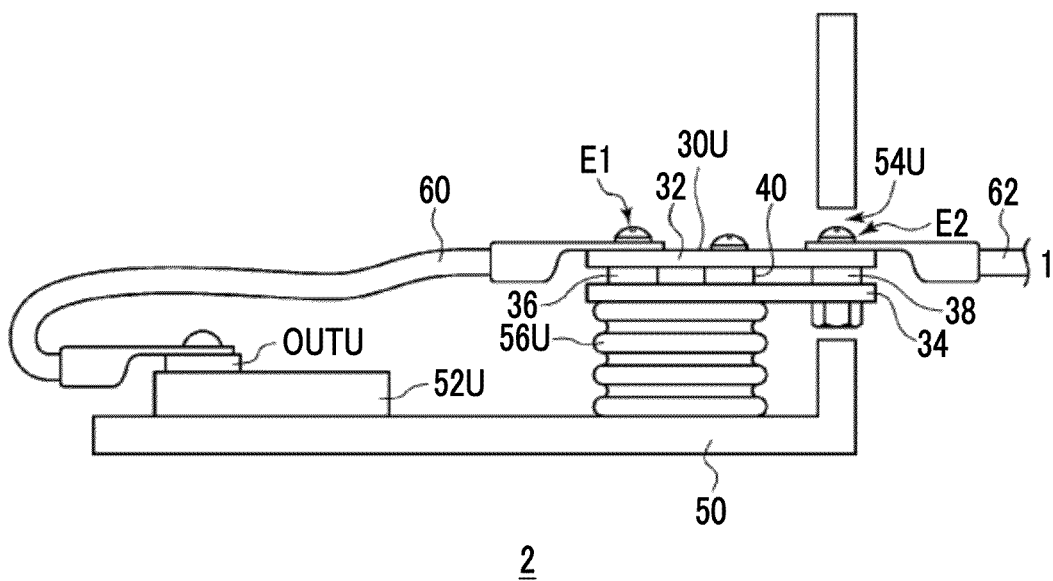
FIG. 10A is a cross-sectional view of a power converter equipped with the bus bar related to another embodiment.
Figure 10B:
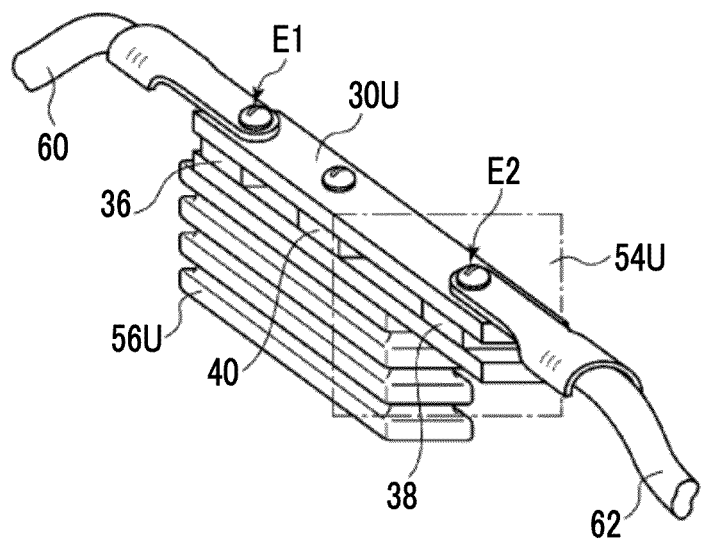
FIG. 10B is a perspective view of the bus bar and an insulating supporter.

As described above, the bus bar 30 is provided on a path to which a high alternating current flows, in the power converter 2. FIG. 10A is a cross-sectional view of the power converter 2 equipped with the bus bar 30 related to the embodiment, and FIG. 10B is a perspective view of the bus bar 30 and an insulating supporter 56.

The power converter 2 includes a housing 50 in addition to the members of FIG. 8. Power modules 52 (U, V, W) are provided for respective phases, and have high-side switches MH (U, V, W) and low-side switches ML (U, V, W) for corresponding phases built therein. U, V, and W attached to respective numerals represent members relevant to a U phase, a V phase, and a W phase. Only a structure relevant to the U phase is illustrated in FIG. 10, and V-phase and W-phase structures are omitted. An opening 54U is provided in the housing 50 in order to allow a wiring line for connecting an output terminal OUTU of the power module 52U and the load 1 to pass therethrough.

The insulating supporter 56U is screwed to a bottom surface of the housing 50. A bus bar 30U is provided between the output terminal OUTU for the U phase and the load 1, and becomes a portion of a wiring line that connects the output terminal OUTU and the load 1. More specifically, the bus bar 30U also functions as a terminal for connecting an external wiring line 62 that connects the power converter 2 and the load 1.

The first end E1 of the bus bar 30U is screwed to an upper surface of the insulating supporter 56U. Additionally, one end of an internal wiring line 60 is screwed to the first end E1 of the bus bar 30U. The other end of the internal wiring line 60 is screwed to the output terminal OUTU of the power module 52U.

A second end E2 of the bus bar 30U is exposed to the outside of the housing 50 via an opening 54U. One end of the external wiring line 62 is screwed to the second end E2 of the bus bar 30U. The external wiring line 62 is connected to a load (not illustrated).

The bus bar 30U includes a third spacer 40 in addition to the bus bar 30 of FIG. 9. The third spacer 40 is provided between the first end E1 of the first plate 32 and the second plate 34 and the second end E2 thereof. The third spacer 40 electrically connects corresponding places of the first plate 32 and the second plate 34.

Figure 11A:
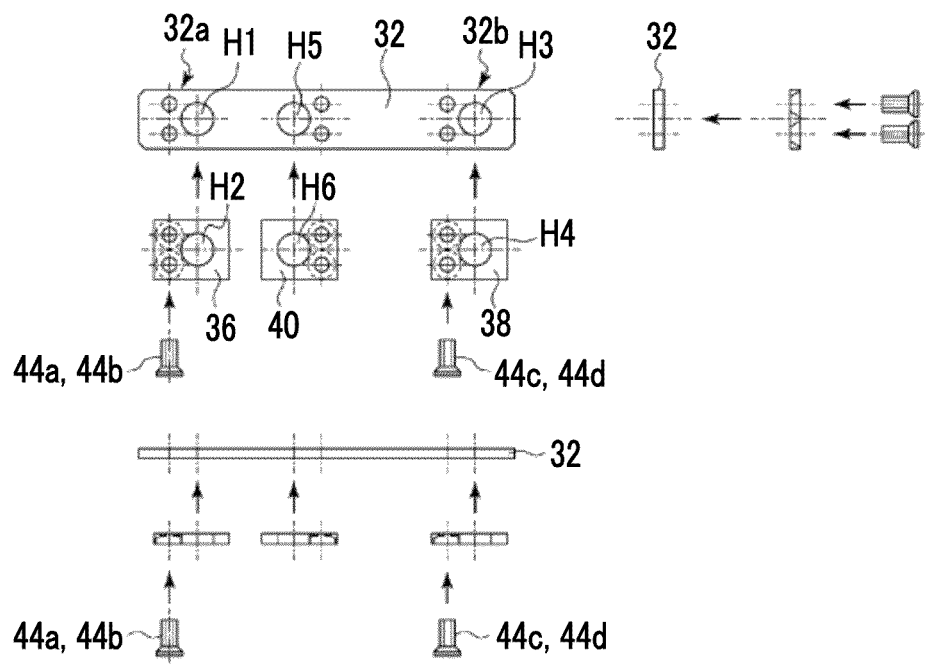
FIGS. 11A to 11C are views illustrating a detailed configuration of the bus bar.
Figure 11B:
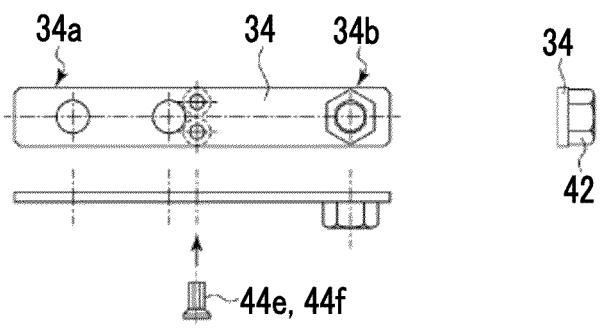
Figure 11C:
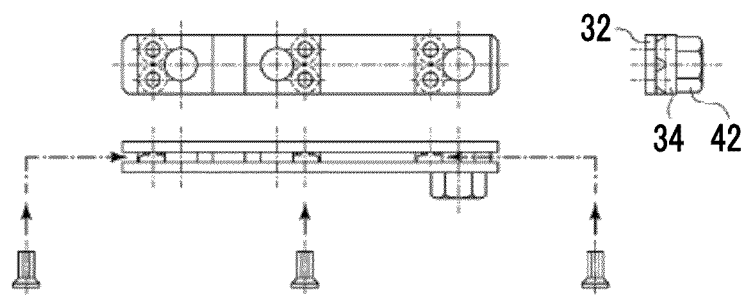

FIGS. 11A to 11C are views illustrating the detailed configuration of the bus bar 30U. FIG. 11A is a plan view, a front view, and a side view of the first plate 32, the first spacer 36, the second spacer 38, and the third spacer 40. FIG. 11B is a bottom plan view, a front view, and a side view of the second plate 34 and a nut 42. FIG. 11C is a plan view, a bottom plan view, and a side view of the whole bus bar 30U.

As illustrated in FIG. 11A, the first plate 32 and the first spacer 36 are connected by two screws 44a and 44b. Additionally, openings H1 and H2 are respectively provided in corresponding places of the first plate 32 and the first spacer 36. Similarly, the first plate 32 and the second spacer 38 are connected by two screws 44c and 44d. Additionally, openings H3 and H4 are respectively provided in corresponding places of the first plate 32 and the second spacer 38. Additionally, openings H5 and H6 are respectively provided in corresponding places of the first plate 32 and the third spacer 40.

As illustrated in FIG. 11B, a nut 42 is provided in the place of the opening H3 of the second plate 34. As illustrated in FIG. 11C, the first plate 32 and the second plate 34 are connected by screws 44e and 44f.

The above configuration is the specific configuration of the bus bar 30U.

Subsequently, the advantages of the power converter 2 equipped with the bus bar 30 related to the embodiment will be described.

Figure 12A:
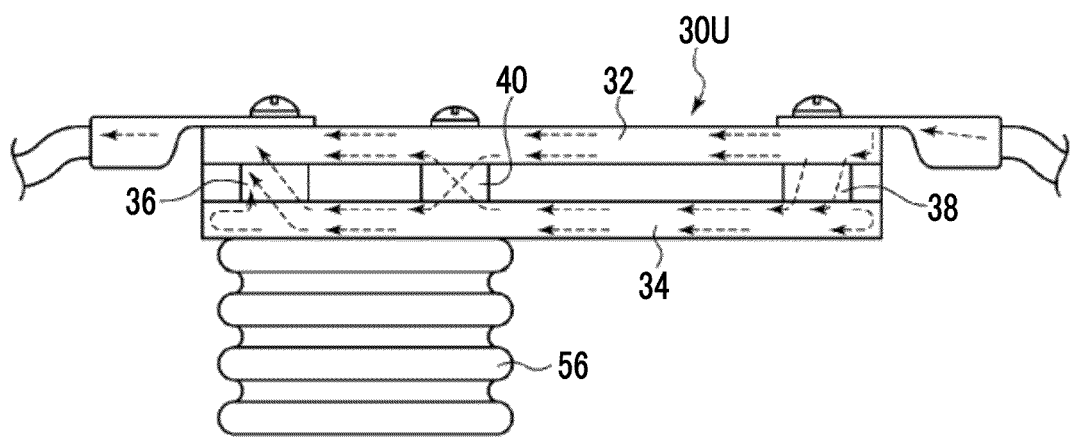
FIG. 12A is a view illustrating an aspect where a current flows to the bus bar, in the power converter of FIG. 10.
Figure 12B:
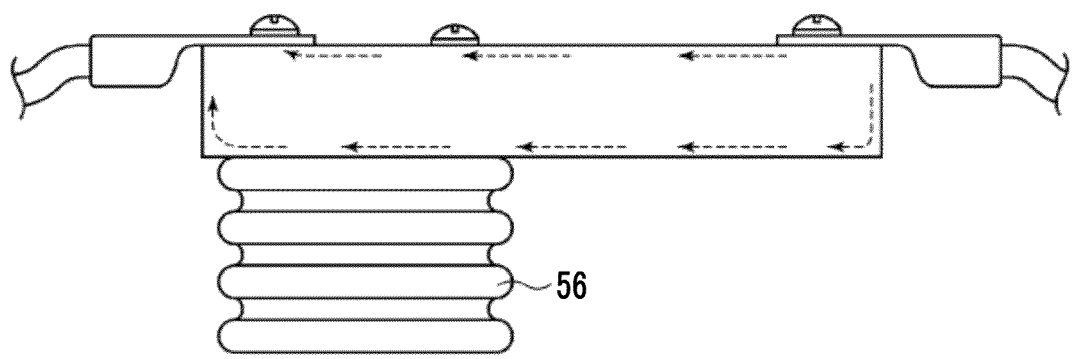
FIG. 12B is a view illustrating an aspect where a current flows to a single-plate bus bar.

Subsequently, the effects of the bus bar 30 will be described. FIG. 12A is a view illustrating an aspect where a current flows to the bus bar 30, in the power converter 2 of FIG. 10, and FIG. 12B is a view illustrating an aspect where a current flows to a single-plate bus bar. The flow of the current is shown by a dashed-line arrow.

As illustrated in FIG. 12B, when the single-plate bus bar is used, a current is concentrated on the surface of a conductor due to the skin effect, and the current hardly flows to the inside of the conductor. Accordingly, even if the thickness d of the conductor is increased, direct current resistance becomes small, but impedance against an alternating current does not become small, and even if the volume of the bus bar is increased, the current capacity is not increased very much.

On the other hand, according to the bus bar 30 related to the embodiment, an alternating current flows to respective surfaces of the first plate 32 and the second plate 34. Therefore, it is possible to increase the capacity compared to the single-plate bus bar that occupies the same space.

Additionally, the third spacer 40 is provided, and the first plate 32 and the second plate 34 are electrically connected in intermediate places thereof as well as both ends thereof, so that a current can be made to flow into and flow out of the plates in the intermediate places. Therefore, the current can be prevented from being concentrated on one plate. Accordingly, an alternating current can be applied effectively using all the surfaces of the first plate 32 and the second plate 34, and it is possible to further increase the capacity.

The invention has been described above on the basis of the embodiment. It will be understood by those skilled in the art that the invention is not limited to the above embodiment, various design changes can be made, and such modification examples are also within the scope of the invention. Such modification examples will be described below.

First Modification Example

Although a case where the bus bar 30 is used for a terminal for connecting the external wiring line has been described in FIG. 10, the invention is not limited to this. FIG. 13A is a cross-sectional view of a power converter 2a related to a first modification example, and FIG. 13B is a perspective view of a bus bar 30b of FIG. 13A. Similar to FIG. 10, only a U-phase structure is illustrated in FIG. 13, and V-phase and W-phase are omitted.

A bus bar 30a corresponds to the bus bar 30U of FIG. 10. The power converter 2a includes a bus bar 30b instead of the internal wiring line 60 of FIG. 10. The structure of the bus bar 30b is similar to that of the bus bar 30a.

The power converter 2a includes a plurality of power modules 52U_1 and 52U_2 that are connected in parallel for achieving high capacity. The plurality of power modules 52U_1 and 52U_2 has an upper arm and a lower arm built therein (both are not illustrated), respectively, and an alternating-current terminal (output terminal) OUTU is provided at a connection point between the upper arm and the lower arm. The first end E1 of the bus bar 30b and the alternating-current terminal OUTU of the power module 52U_1 are connected via a vertical bus bar 64. Additionally, the place of the third spacer 40 of the bus bar 30b and the alternating-current terminal OUTU of the power module 52U_2 are connected via a vertical bus bar 66. The second end E2 of the bus bar 30b, and the bus bar 30a are connected via a vertical bus bar 68.

In this way, when it is difficult to provide a thick internal wiring line inside the housing 50, space-saving wiring is allowed by using the bus bar 30b.

Second Modification Example

Figure 14A:
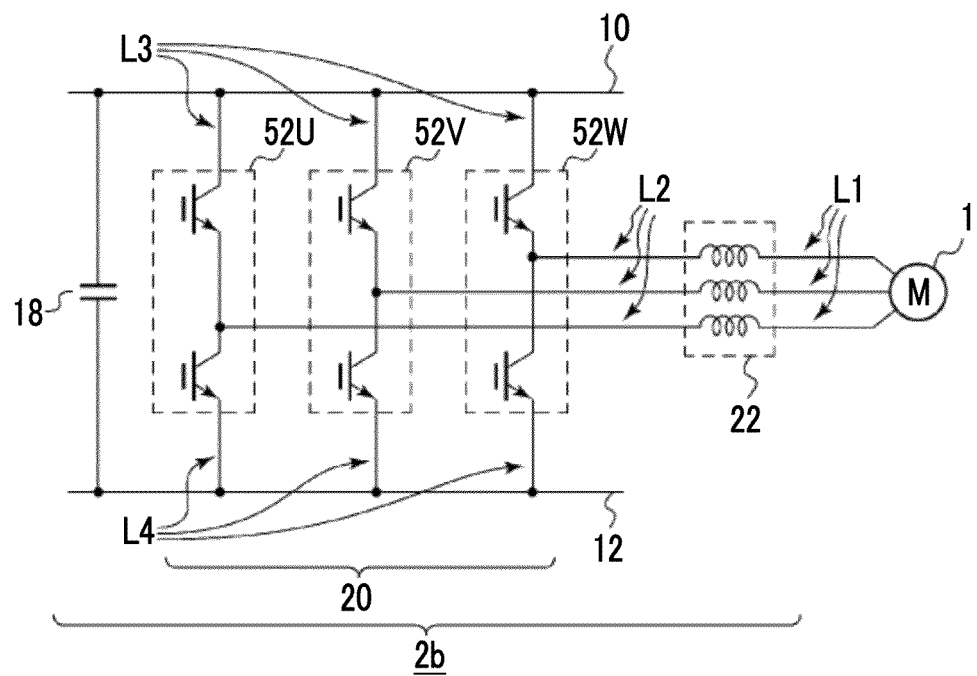
FIGS. 14A and 14B are equivalent circuit diagrams of power converters.
Figure 14B:
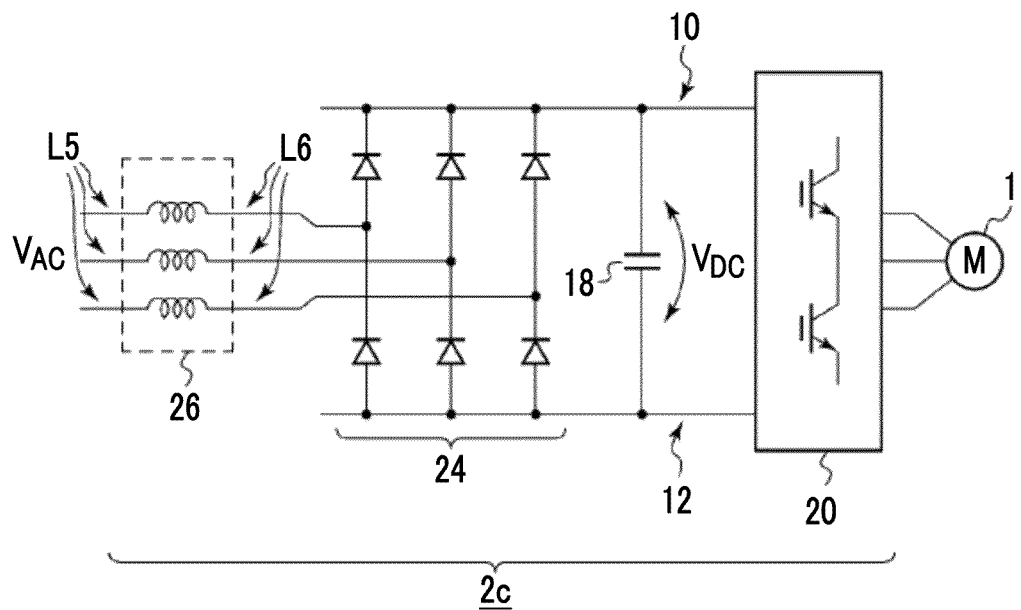

Although a case where the bus bar 30 is a wiring line between the output terminal OUTU of the power module, and the load has been described in the previous embodiments, the invention is not limited to this. FIGS. 14A and 14B are equivalent circuit diagrams of power converters.

A power converter 2b of FIG. 14A further includes an output reactor 22 provided between the inverter 20 and the load 1. The above-described bus bar 30 may be used for a wiring line L1 between the load 1 and the output reactor 22, or may be used for a wiring line L2 between the inverter 20 and the output reactor 22. Otherwise, the above-described bus bar may be used for a wiring line L3 between the power module 52 and the upper power supply line 10, or may be used for a wiring line L4 between the power module 52 and the lower power supply line 12. Otherwise, the above-described bus bar may be used for a wiring line between the smoothing capacitor 18 and the inverter 20.

A power converter 2c of FIG. 14B includes a converter 24 provided at a preceding stage of the inverter 20 and an input reactor 26 provided at a preceding stage of the converter 24. The above-described bus bar 30 may be used for a wiring line L5 between a commercial alternating current power source and the input reactor 26, or may be used for a wiring line L6 between the input reactor 26 and the converter 24.

Third Modification Example

Figure 15:
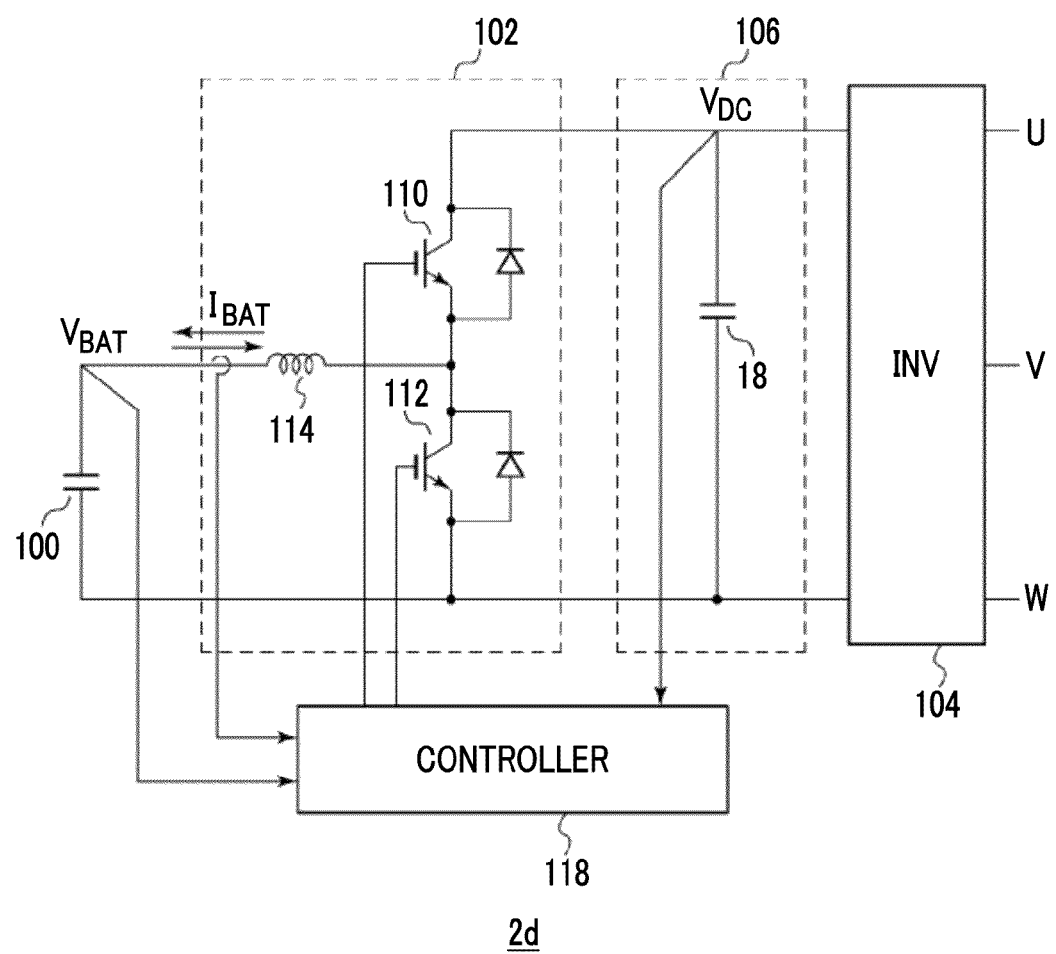
FIG. 15 is a circuit diagram illustrating the configuration of a power converter related to a third modification example.

FIG. 15 is a circuit diagram illustrating the configuration of a power converter 2d related to a third modification example. The power converter 2d includes a power storage unit 100, a step-up/down converter 102, an inverter 104, a DC bus 106, and a controller 118. The power storage unit 100 is a secondary battery or a capacitor.

The power converter 2d converts the electric power from the power storage unit 100 into an alternating current and supplies the electric current to a load (not illustrated), during the powering operation. The power converter 2d recovers the electric power from the load and stores electricity in the power storage unit 100, during the regenerative operation.

The step-up/down converter 102 includes power modules 110 and 112 including insulated gate bipolar transistors (IGBTs), and a reactor 114. During the powering operation, the step-up/down converter 102 receives a direct current voltage $V_{BAT}$ from the power storage unit 100, steps up the voltage to generate a direct current voltage $V_{DC}$, and supplies the direct current voltage $V_{DC}$ to the inverter 104 via the DC bus 106. The DC bus 106 includes the smoothing capacitor 18 provided between a P wire and an N wire, and smoothes the direct current voltage $V_{DC}$. The inverter 104 receives the direct current voltage $V_{DC}$ from the DC bus 106, converts the direct current voltage into an alternating current, and supplies the alternating current to a load. The controller 118 switches the power modules 110 and 112 on the basis of on the monitoring results of the battery current $I_{BAT}$, the battery voltage $V_{BAT}$, and the direct current voltage $V_{BAT}$.

During the regenerative operation, the inverter 104 converts an alternating-current signal generated by a load into a direct current voltage $V_{DC}$. The direct current voltage $V_{DC}$ is smoothed by the DC bus 106, and is supplied to the step-up/down converter 102. The step-up/down converter 102 steps down the direct current voltage $V_{DC}$, and supplies the stepped-down direct current voltage to the power storage unit 100.

The above-described bus bar 30 can also be applied to between the power storage unit 100 and the reactor 114, between the power storage unit 100 and the power module 110, between the power storage unit 100 and the power module 112, between the power module 110 and the smoothing capacitor 18, and the power module 112 and the smoothing capacitor 18.

Fourth Modification Example

Figure 16:
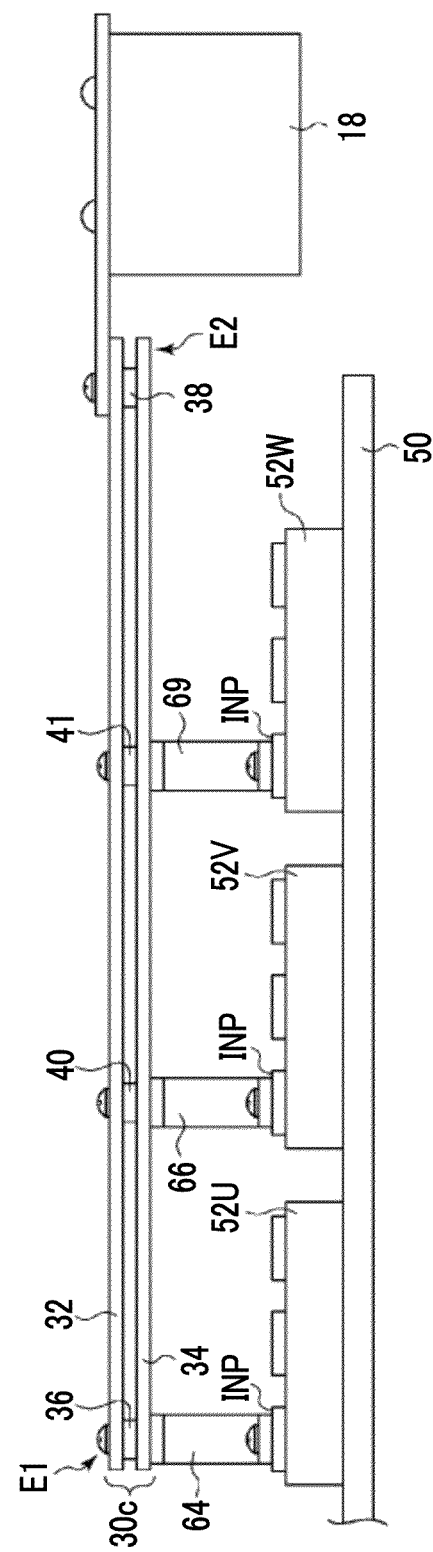
FIG. 16 is a cross-sectional view of a power converter related to a fourth modification example.

FIG. 16 is a cross-sectional view of a power converter related to a fourth modification example. In FIG. 16, a bus bar 30c is provided between the smoothing capacitor 18 and power modules 52U to 52W. That is, the bus bar 30c is equivalent to the upper power supply line 10 of FIG. 8. The structure of the bus bar 30c is similar to that of the bus bar 30b of FIG. 13A. A positive electrode of the smoothing capacitor 18 is connected to the second end E2 of the bus bar 30c. The vertical bus bar 64 connects the first plate 32 and the second plate 34 with a P terminal (direct-current input terminal) of the power module 52U, the vertical bus bar 66 connects the first plate 32 and the second plate 34 with a P terminal (direct-current input terminal) of the power module 52V, and the vertical bus bar 69 connects the first plate 32 and the second plate 34 with a P terminal (direct-current input terminal) of the power module 52W. Similar to FIG. 16, it is possible to apply the bus bar 30c to the lower power supply line 12 of FIG. 8.

Finally, the applications of the power converter 2 will be described. The power converter 2 can be suitably used for working machines or industrial machines including a shovel, a forklift, and an industrial press.

Figure 17:
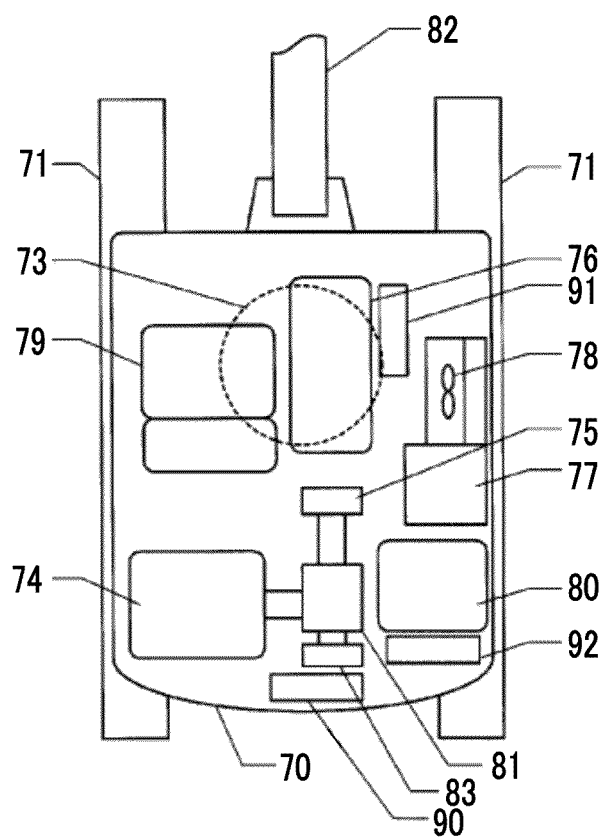
FIG. 17 is a plan view of a shovel that is a working machine.

FIG. 17 is a plan view of a shovel that is a working machine. An upper swivel body 70 is attached to a lower traveling body 71 via a swiveling bearing 73. The upper swivel body 70 is mounted with an engine 74, a main pump 75, an electric motor 76 for swiveling, an oil tank 77, a cooling fan 78, a seat 79, a power storage module 80, a motor generator 83, an inverter 90 for a motor generator, an inverter 91 for swiveling, and a converter 92 for a power storage. The engine 74 generates power through combustion of fuel. The engine 74, the main pump 75, and the motor generator 83 mutually send and receive a torque via a torque transmission mechanism 81. The main pump 75 supplies pressure oil to a hydraulic cylinder of a boom 82 or the like.

The motor generator 83 is driven by the power of the engine 74 to generate electricity (power-generating operation). The generated electric power is supplied to the power storage module 80, and the power storage module 80 is charged. Additionally, the motor generator 83 is driven by the electric power from the power storage module 80, and generates the power for assisting the engine 74 (assisting operation). The oil tank 77 stores oil of a hydraulic circuit. The cooling fan 78 suppresses a rise in the oil temperature of the hydraulic circuit. A manipulator sits down on the seat 79 to manipulate a hybrid shovel.

Figure 18:
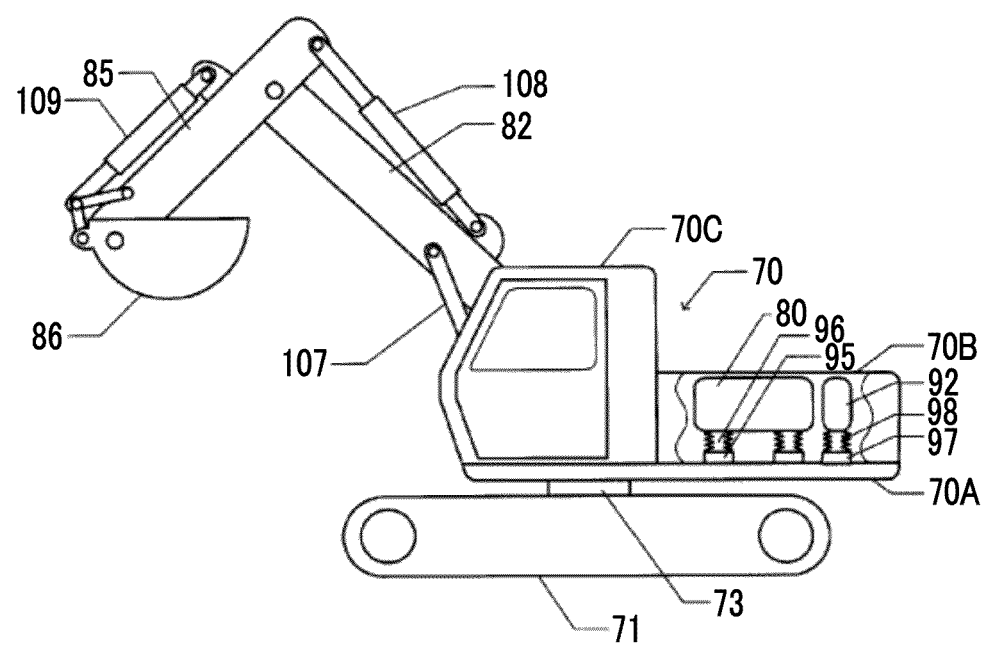
FIG. 18 is a partially broken side view of the shovel of FIG. 17.

FIG. 18 is a partially broken side view of the shovel of FIG. 17. The upper swivel body 70 is mounted on the lower traveling body 71 via the swiveling bearing 73. The upper swivel body 70 includes a swiveling frame 70A, a cover 70B, and a cabin 70C. The swiveling frame 70A functions as a supporting structure of the cabin 70C and various parts. The cover 70B covers various parts mounted on the supporting structure 70A, for example, the power storage module 80, the converter 92 for a power storage, and the like. The seat 79 (FIG. 17) is housed within the cabin 70C.

The electric motor 76 (FIG. 17) for swiveling swivels the swiveling frame 70A, which is an object to be driven, in a clockwise direction or in a counterclockwise direction with respect to the lower traveling body 71. The boom 82 is attached to the upper swivel body 70. The boom 82 is swung in an up-and-down direction with respect to the upper swivel body 70 by the boom cylinder 107 that is hydraulically driven. The arm 85 is attached to the tip of the boom 82. The arm 85 is swung in a front-and-rear direction with respect to the boom 82 by the arm cylinder 108 that is hydraulically driven. A bucket 86 is attached to the tip of the arm 85. The bucket 86 is swung in the up-and-down direction with respect to the arm 85 by a bucket cylinder 109 that is hydraulically driven.

The power storage module 80 is mounted on the swiveling frame 70A via a mount 95 for a power storage module, and a damper (vibration-proofing device) 96. The converter 92 for a power storage is mounted on the swiveling frame 70A via a mount 97 for a converter, and a damper 98. The cover 70B covers the power storage module 80. The electric motor 76 (FIG. 17) for swiveling is driven by the electric power supplied from the power storage module 80. Additionally, the electric motor 76 for swiveling generates regenerative electric power by converting kinetic energy into electrical energy. The power storage module 80 is charged by the generated regenerative electric power.

Figure 19:
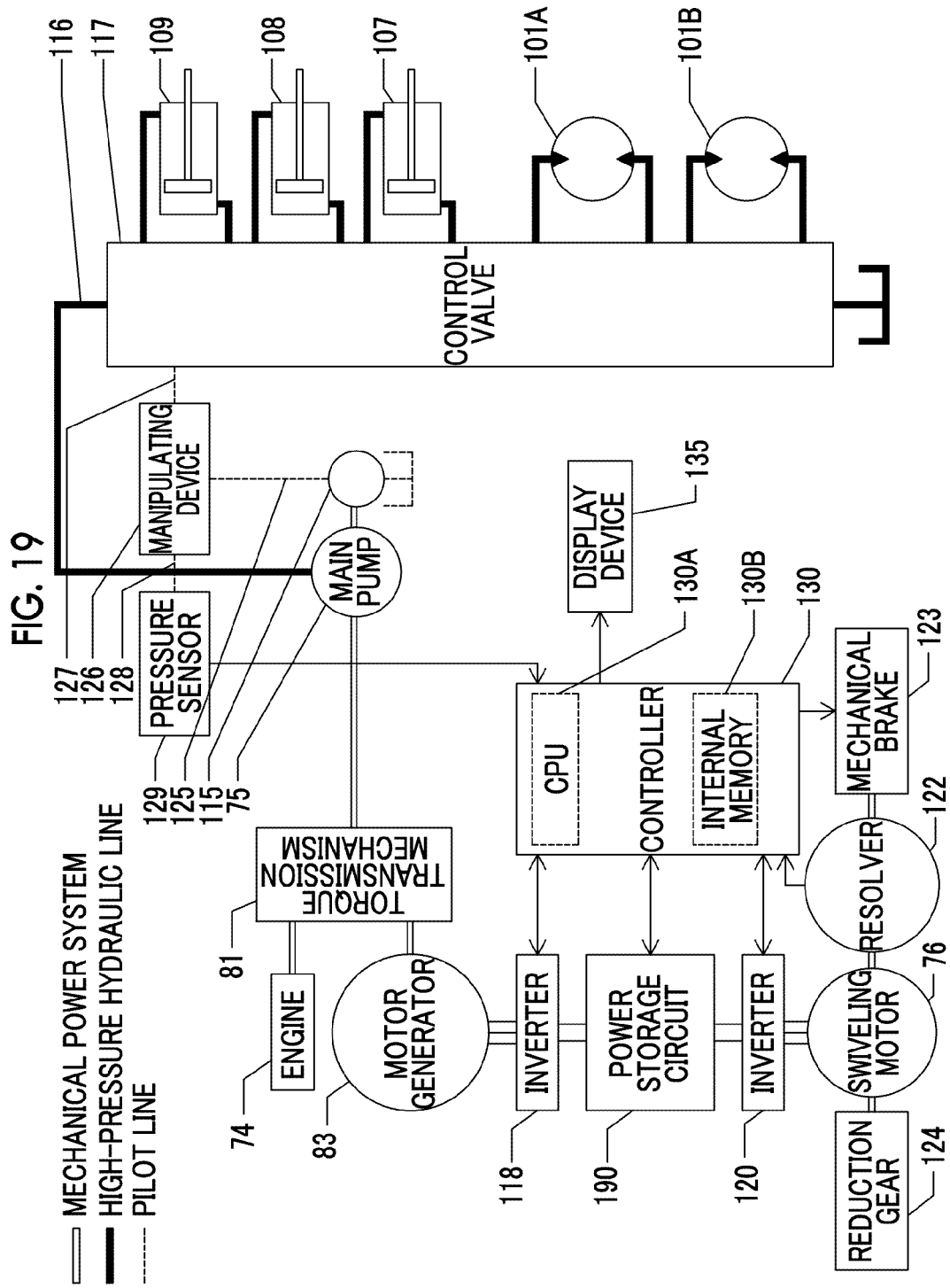
FIG. 19 is a block diagram of the shovel of FIG. 17.

FIG. 19 is a block diagram of the shovel of FIG. 17. In FIG. 19, a mechanical power system is shown by double lines, high-pressure hydraulic lines are shown by thick solid lines, and pilot lines is shown by dashed lines.

A drive shaft of the engine 74 is coupled to an input shaft of the torque transmission mechanism 81. Internal combustion engines, such as an engine that generates a driving force with fuel other than electricity, for example, a diesel engine, are used for the engine 74. The engine 74 is always driven during the operation of a working machine.

A drive shaft of the motor generator 83 is coupled to another input shaft of the torque transmission mechanism 81. The motor generator 83 can perform operation motions of both electrically-powered (assist) operation and the power-generating operation. An internal magnets-embedded (IPM) motor in which magnets are embedded inside a rotor, for example, is used for the motor generator 83.

The torque transmission mechanism 81 has two input shafts and one output shaft. A drive shaft of the main pump 75 is connected to the output shaft.

When a load applied to the engine 74 is large, the motor generator 83 performs the assisting operation, and the driving force of the motor generator 83 is transmitted to the main pump 75 via the torque transmission mechanism 81. This reduces the load applied to the engine 74. On the other hand, when the load applied to the engine 74 is small, the power-generating operation of the motor generator 83 is performed by transmitting the driving force of the engine 74 to the motor generator 83 via the torque transmission mechanism 81. When the assisting operation of the motor generator 83 is performed, three-phase AC power is supplied from the inverter to the motor generator 83. When the power-generating operation of the motor generator 83 is performed, three-phase AC power is supplied from the motor generator 83 to the inverter 90. The inverter 90 is controlled by the control device 130.

The control device 130 includes a central processing unit (CPU) 130A and an internal memory 130B. The CPU 130A executes a program for driving control that is stored in the internal memory 130B. The control device 130 displays the degradation state or the like of various devices on a display device 135 to thereby call a driver's attention.

The main pump 75 supplies hydraulic pressure to a control valve 117 via a high-pressure hydraulic line 116. The control valve 117 distributes the hydraulic pressure to hydraulic motors 101A and 101B, the boom cylinder 107, the arm cylinder 108, and the bucket cylinder 109 by a command from a driver. The hydraulic motors 101A and 101B respectively drive two left and right crawlers provided at the lower traveling body 71 illustrated in FIG. 20.

Input and output terminals of the electric system of the motor generator 83 are connected to a power storage circuit 190 via the inverter 90. The power storage circuit 190 includes the power storage module 80 (FIG. 17) and the converter 92 (FIG. 17) for a power storage. The inverter 90 converts the three-phase AC power supplied from the motor generator 83 into DC power, on the basis of a command from the control device 130, and supplies the DC power to the power storage circuit 190. Otherwise, the DC power supplied from the power storage circuit 190 is converted into three-phase AC power, and the converted three-phase AC power is supplied to the motor generator 83. The swiveling motor 76 is further connected to the power storage circuit 190 via another inverter 91. The power storage circuit 190 and the inverter 91 are controlled by the control device 130.

The swiveling motor 76 can be AC-driven by a pulse width modulation (PWM) control signal from the inverter 91 to operate both the powering operation and the regenerative operation. For example, the IPM motor is used for the swiveling motor 76. The IPM motor generates a large induced electromotive force during regeneration. During the powering operation, the inverter 91 converts the DC power supplied from the power storage circuit 190 into three-phase AC power, and supplies the converted three-phase AC power to the swiveling motor 76. During the regenerative operation, the inverter 91 converts the three-phase AC power supplied from the swiveling motor 76 into DC power, and supplies the converted DC power to the power storage circuit 190.

During the powering operation of the swiveling motor 76, the swiveling motor 76 swivels the upper swivel body 70 via the reduction gear 124. In this case, the reduction gear 124 lowers the rotating speed. This increases a rotative force generated in the swiveling motor 76. Additionally, during the regenerative operation, the swiveling motor 76 generates regenerative electric power as the rotational motion of the upper swivel body 70 is transmitted to the swiveling motor 76 via the reduction gear 124. In this case, the reduction gear 124 increases the rotating speed contrary to the rotating speed during the powering operation. This can increase the rotation speed of the swiveling motor 76.

The resolver 122 detects the position of a rotary shaft of the swiveling motor 76 in a rotational direction. The detection result is input to the control device 130. By detecting the position of the rotary shaft in the rotational direction before and after the operation of the swiveling motor 76, the swiveling angle and the swiveling direction of the swiveling motor are derived.

A mechanical brake 123 is coupled to the rotary shaft of the swiveling motor 76, and generates a mechanical braking force. The braking state and release state of the mechanical brake 123 receive a control from the control device 130, and are switched by an electromagnetic switch.

The pilot pump 115 generates a pilot pressure required for a hydraulic manipulation system. The generated pilot pressure is supplied to a manipulating device 126 via a pilot line 125. The manipulating device 126 includes a lever or a pedal, and is manipulated by a driver. The manipulating device 126 converts a primary-side hydraulic pressure supplied from the pilot line 125 into a secondary-side hydraulic pressure according to driver's manipulation. The secondary-side hydraulic pressure is transmitted to the control valve 117 via a hydraulic line 127, and is transmitted to a pressure sensor 129 via another hydraulic line 128.

A detection result of pressure detected in the pressure sensor 129 is input to the control device 130. This enables the control device 130 to detect a manipulation situation of the lower traveling body 71, the swiveling motor 76, the boom 82, the arm 85, and the bucket 86. Particularly, in the hybrid shovel, the swiveling motor 76 drives the swiveling bearing 73. For this reason, it is desired to detect the manipulation quantity of a lever for controlling the swiveling motor 76 with high precision. The control device 130 can detect the manipulation quantity of the lever via the pressure sensor 129 with high precision.

The power converter 2 related to an above-described embodiment is used for the inverter 90 for a motor generator, the inverter 91 for swiveling, and the converter 92 for a power storage, which are illustrated in FIG. 17. According to this working machine, the power converter can be efficiently arranged in a narrow space by constituting wiring lines required for high capacity, using the above-described bus bar 30, within the inverter 90 for a motor generator, the inverter 91 for swiveling, and the converter 92 for a power storage.

Figure 20:
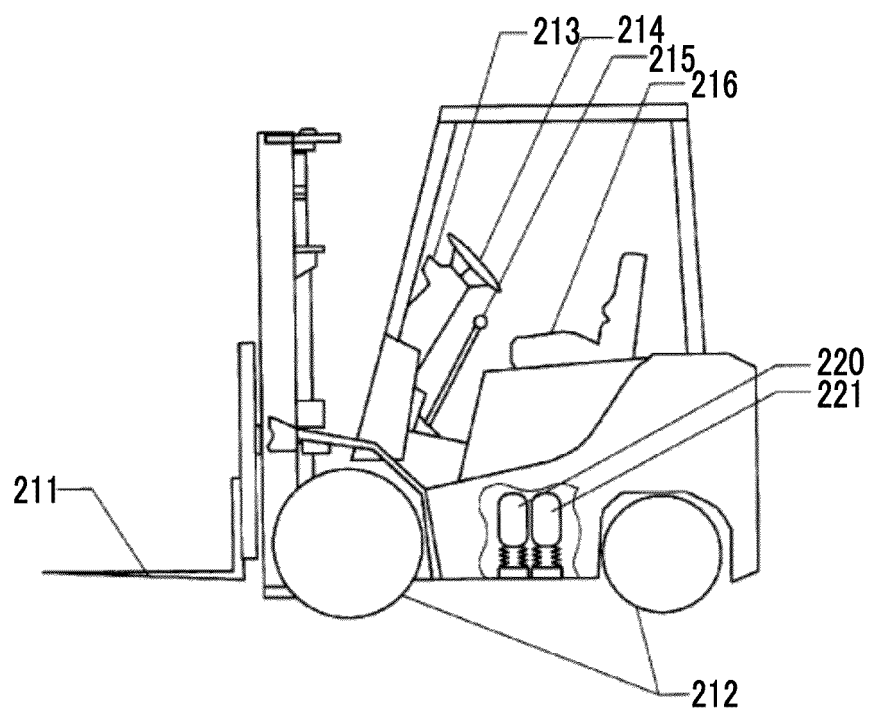
FIG. 20 is a partially broken side view of a cargo handling vehicle (forklift) that is a working machine.

FIG. 20 is a partially broken side view of a cargo handling vehicle (forklift) that is a working machine. The cargo handling vehicle includes a fork 211, wheels 212, an instrument panel 213, a steering wheel 214, levers 215, and a seat 216. An inverter 220 for a traveling motor and a converter 221 for a power storage are mounted on a chassis via a damper or the like. The inverter 220 for a traveling motor supplies electric power to a motor for driving. The converter 221 for a power storage performs charge and discharge of a power storage.

The driver gets into the seat 216, and manipulates the steering wheel 214, the plurality of levers 215, an accelerator pedal, a brake pedal, and other various switches. Movements, such as lifting and lowering of the fork 211, advance and retreat, and right turn and left turn of the cargo handling vehicle, are performed by the manipulation of these members. Shipping and discharging, transporting, or the like of a load can be performed by combining these movements.

According to this working machine, the power converter can be efficiently arranged in a narrow space by constituting wiring lines required for high capacity, using the above-described bus bar 30, within the inverter 220 for a traveling motor and the converter 221 for a power storage.

Figure 21A:
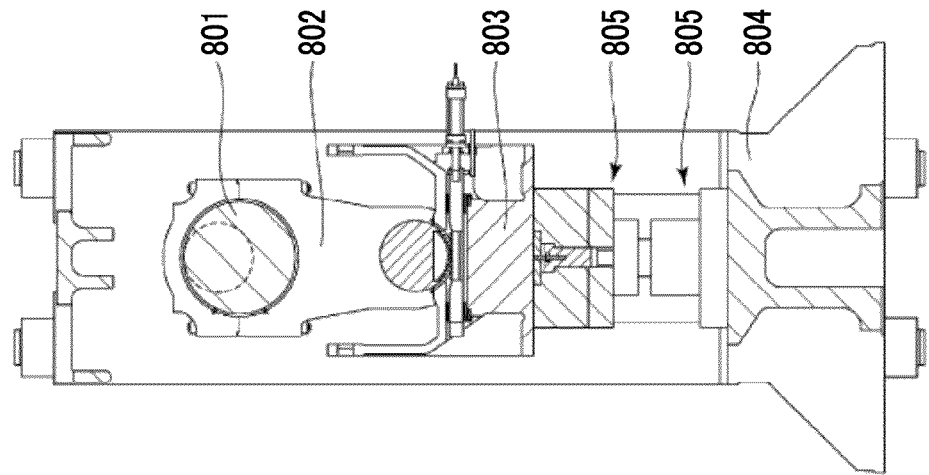
FIGS. 21A and 21B are a front view and a side view of a forging press machine that is a working machine.
Figure 21B:
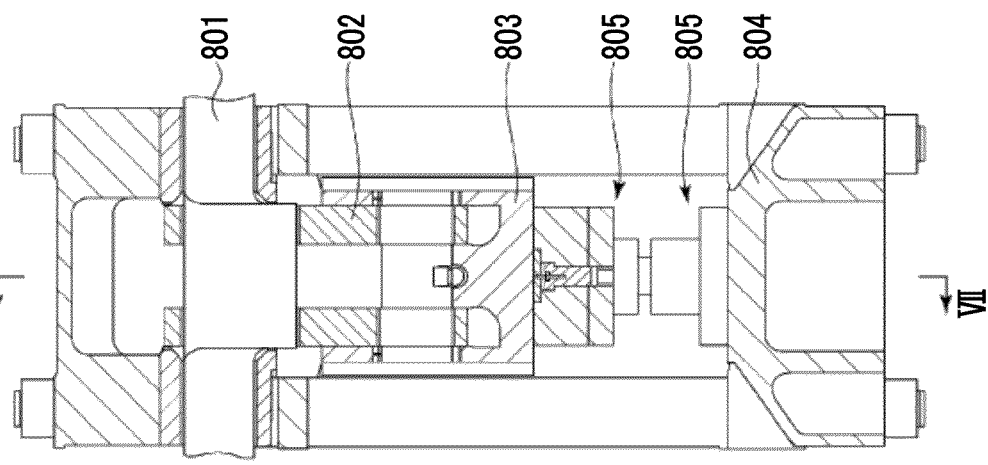

FIGS. 21A and 21B are a front view and a side view of a forging press machine that is a working machine.

Closed forging is a method of using upper and lower dies and a punch, and pushing a punch into a material, filling a mold space with the material, and molding the material after the upper and lower dies are clamped and the material is confined in the mold space. A double-acting forging press is used for this closed forging, and is adapted so as to pressurize the upper and lower dies and the punch at separate timings with a plurality of pressurizing devices.

As the forging press, there are mechanical presses, such as a connecting rod type, a knuckle type, and a link type. As illustrated in FIGS. 21A and 21B, a general connecting rod press has a structure in which an eccentric shaft 801, and a connecting rod 802 rotatably fitted into an eccentric part of the eccentric shaft 801 are used, and a slide 803 is rockably attached to a lower end of the connecting rod 802. For this reason, if the eccentric shaft 801 is rotated, the connecting rod 802 can be rocked to vertically lift and lower the slide 803.

Since the mechanical presses, such as the connecting rod press, can perform slide driving simply with a simple rotational motion and a rectilinear motion, a high-speed and high-precision operation can be performed compared to a fluid pressure type press.

Figure 22:
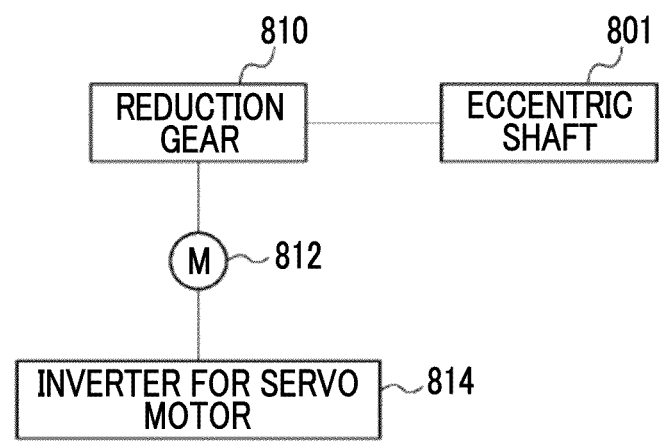
FIG. 22 is a block diagram of the forging press machine.

FIG. 22 is a block diagram of the forging press machine. In the forging press, a drive mechanism, such as a servo motor 812, is coupled to the eccentric shaft 801 via a reduction gear 810 or the like. An inverter 814 is used in order to drive the servo motor 812. The power converter 2 related to the embodiment is used for the inverter 814.

According to this working machine, the power converter can be efficiently arranged in a narrow space by constituting wiring lines required for high capacity, using the above-described bus bar 30, within the inverter 814 for a servo motor.

The following technical idea is disclosed in the present specification.

1. One aspect of the technical idea relates to a power converter for an industrial machine. The power converter includes at least one power module, a capacitor, and a bus bar provided between any two among a load to be driven, the power module, and the capacitor. The bus bar includes a first plate, a second plate, a first spacer configured to support respective corresponding first ends of the first plate and the second plate with a predetermined distance therebetween and to electrically connect the respective first ends of the first plate and the second plate, and a second spacer configured to support respective corresponding second ends of the first plate and the second plate with a predetermined distance therebetween and to electrically connect the respective second ends of the first plate and the second plate.

2. In a certain aspect, the power converter may further include a reactor. The bus bar may be provided between any two among the load, the power module, the capacitor, and the reactor.

3. In a certain aspect, the bus bar may further include at least one third spacer that is provided in at least one place between the first end and the second end of the first plate and the second plate and is configured to electrically connect corresponding places of the first plate and the second plate with each other.

The invention can be used for industrial machines.

It should be understood that the invention is not limited to the above-described embodiments, but may be modified into various forms on the basis of the spirit of the invention. Additionally, the modifications are included in the scope of the invention.

What is claimed is:

1. An industrial machine comprising a power converter, wherein the power converter includes:
   at least one power module;
   a capacitor; and
   a bus bar provided between any two among a load to be driven, the power module, and the capacitor,
   wherein the bus bar includes:
   a first plate;
   a second plate;
   a first spacer configured to support respective corresponding first ends of the first plate and the second plate with a predetermined distance therebetween and to electrically connect the respective first ends of the first plate and the second plate with each other; and
   a second spacer configured to support respective corresponding second ends of the first plate and the second plate with a predetermined distance therebetween and to electrically connect the respective second ends of the first plate and the second plate with each other.

2. The industrial machine according to claim 1, wherein the power converter further includes a reactor, and wherein the bus bar is provided between any two among the load, the power module, the capacitor, and the reactor.

3. The industrial machine according to claim 1, wherein the bus bar includes at least one third spacer that is provided in at least one place between the first ends and the second ends of the first plate and the second plate and is configured to electrically connect corresponding places of the first plate and the second plate with each other.

4. The industrial machine according to claim 1,
wherein the industrial machine is an industrial vehicle including a traveling mechanism and an upper swivel body mounted on the traveling mechanism so as to be capable of being swiveled,
wherein the industrial machine includes an electrical swiveling device configured to control an AC motor that swivels and drives the upper swivel body with respect to the traveling mechanism, and
wherein the electrical swiveling device includes a carrier frequency control unit that lowers the carrier frequency of the power converter as a current flowing to the power converter becomes larger, in addition to the power converter that is provided at the upper swivel body to drive the AC motor as the load.

5. The industrial machine according to claim 4,
wherein the carrier frequency control unit changes the carrier frequency during swiveling acceleration of the AC motor.

6. The industrial machine according to claim 4,
wherein the carrier frequency control unit changes the carrier frequency during swiveling deceleration of the AC motor.

7. The industrial machine according to claim 4,
wherein the carrier frequency control unit lowers the carrier frequency as the temperature of the power module constituting the power converter becomes higher.

8. The industrial machine according to claim 4,
wherein the carrier frequency control unit keeps the carrier frequency constant when a current flowing to the power converter is equal to or lower than a predetermined value, and lowers the carrier frequency linearly according to the current when the current flowing to the power converter becomes higher than the predetermined value.

* * * * *